United States Patent
Witherbee et al.

(10) Patent No.: US 11,661,759 B2
(45) Date of Patent: May 30, 2023

(54) ATTACHMENT DEVICE FOR A NON-STRUCTURAL COMPONENT OF A BUILDING

(71) Applicant: Eaton Intelligent Power Limited, Dublin (IE)

(72) Inventors: Martin Lee Witherbee, Godfrey, IL (US); Hemraj K. Thorat, Pune (IN); Amol Khalkar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 19 days.

(21) Appl. No.: 16/990,866

(22) Filed: Aug. 11, 2020

(65) Prior Publication Data

US 2021/0047854 A1 Feb. 18, 2021

Related U.S. Application Data

(60) Provisional application No. 62/886,016, filed on Aug. 13, 2019.

(51) Int. Cl.
*F16B 2/02* (2006.01)
*F16B 7/04* (2006.01)
(Continued)

(52) U.S. Cl.
CPC ............. *E04H 9/021* (2013.01); *E04B 1/98* (2013.01); *F16B 2/02* (2013.01); *F16B 2/08* (2013.01); *F16B 7/04* (2013.01); *F16B 11/006* (2013.01)

(58) Field of Classification Search
CPC ... E04H 9/021; E04B 1/98; F16B 2/22; F16B 7/04; F16B 11/006; F16B 2/02; F16B 2/08; F16B 2/14; F16B 2/18; F16L 3/133
See application file for complete search history.

(56) References Cited

U.S. PATENT DOCUMENTS 2,058,752 A * 10/1936 Wray ................. F16L 3/00
                                                                       248/65
3,454,247 A * 7/1969 Geisinger ............. H01B 17/26
                                                                      248/74.3
(Continued)

FOREIGN PATENT DOCUMENTS

CN 106415101 A 2/2017
CN 106835997 A 6/2017
(Continued)

OTHER PUBLICATIONS

International Search Report and Written Opinion for PCT/EP2020/025373, dated Oct. 28, 2020, 13, pages, Rijswijk, Netherlands.

(Continued)

*Primary Examiner* — Phi D A
(74) *Attorney, Agent, or Firm* — Stinson LLP

(57) ABSTRACT

An attachment device for securing a non-structural component of a building to a structural component of the building includes a non-structural component holder defining a receiving space configured to receive the non-structural component to couple the non-structural component to the attachment device. The non-structural component holder applies generally no compressive force against the non-structural component when the non-structural component is disposed in the receiving space so that the non-structural component is free to move relative to the non-structural component holder. A stop is configured to be secured to the non-structural component. The stop is configured to engage the non-structural component holder to inhibit movement of the non-structural component relative to the non-structural component holder when the stop and non-structural component holder are secured to the non-structural component.

11 Claims, 17 Drawing Sheets

FIG. 2

(51) Int. Cl.
*E04H 9/02* (2006.01)
*E04B 1/98* (2006.01)
*F16B 11/00* (2006.01)
*F16B 2/08* (2006.01)

(56) References Cited

U.S. PATENT DOCUMENTS

| | | | | |
|---|---|---|---|---|
| 3,539,137 | A * | 11/1970 | March | F16L 59/135 248/62 |
| 4,407,478 | A * | 10/1983 | Hodges | F16L 3/237 248/542 |
| 4,865,279 | A * | 9/1989 | Kosugi | F16L 3/223 248/68.1 |
| 4,909,462 | A * | 3/1990 | Usui | F16L 3/1226 248/68.1 |
| 4,951,902 | A * | 8/1990 | Hardtke | F16L 3/1016 248/74.1 |
| 5,192,039 | A * | 3/1993 | Williams | F16L 59/135 248/62 |
| 6,273,372 | B1 | 8/2001 | Heath | |
| 6,467,734 | B1 * | 10/2002 | Brown | E03C 1/021 248/65 |
| 7,207,527 | B2 * | 4/2007 | Opperthauser | F16L 59/135 248/62 |
| 9,360,139 | B1 | 6/2016 | Clement et al. | |
| 2006/0096224 | A1 * | 5/2006 | Asbury | F16B 11/006 52/582.1 |
| 2007/0051465 | A1 * | 3/2007 | Naughton | B62D 27/026 156/305 |
| 2013/0206335 | A1 * | 8/2013 | Renius | C09J 5/00 156/305 |
| 2016/0273566 | A1 * | 9/2016 | Ortwein | C09J 5/00 |
| 2017/0314597 | A1 | 11/2017 | Somerfield | |
| 2021/0102369 | A1 * | 4/2021 | Canby | E04B 1/2604 |

FOREIGN PATENT DOCUMENTS

| | | |
|---|---|---|
| CN | 109751457 A | 5/2019 |
| JP | H08 277967 A | 10/1996 |
| JP | H09 242720 A | 9/1997 |
| JP | 2013-223377 A | 10/2013 |
| KR | 2019 0086285 A | 7/2019 |

OTHER PUBLICATIONS

First Office Action and Search Report from CN Application No. 202080062115.7, dated Mar. 2, 2023, 9 pages.

\* cited by examiner

US 11,661,759 B2

ATTACHMENT DEVICE FOR A NON-STRUCTURAL COMPONENT OF A BUILDING

FIELD OF THE DISCLOSURE

The present disclosure generally relates to attachment devices for coupling a non-structural component to a structural component of a building.

BACKGROUND OF THE DISCLOSURE

Seismic supporting systems are used to support non-structural components (e.g., pipes) in a building. Seismic supporting systems typically include seismic sway braces and restraints. Sway braces and restraints are used to secure non-structural components to a building and minimize the differential movement between the non-structural components and the building itself. Examples of non-structural components in a building include, but are not limited to, pipes, conduits, round ducts, fittings, etc. An attachment device (e.g., pipe attachment device) attaches to the non-structural component (e.g., the pipe) and the sway brace or restraint to couple the sway brace or restraint to the non-structural component. One conventional attachment device includes a clamp (e.g., pipe clamp) that attaches to the non-structural component (e.g., pipe) and to the sway brace, restraint or other bracing member. The sway brace or restraint is then attached to a structural element of the building (e.g., a beam), thereby securing the non-structural component to the building.

SUMMARY OF THE DISCLOSURE

In one embodiment, an attachment device for securing a non-structural component of a building to a structural component of the building generally comprises a non-structural component holder defining a receiving space configured to receive the non-structural component to couple the non-structural component to the attachment device. The non-structural component holder applies generally no compressive force against the non-structural component when the non-structural component is disposed in the receiving space so that the non-structural component is free to move relative to the non-structural component holder. A stop is configured to be secured to the non-structural component. The stop is configured to engage the non-structural component holder to inhibit movement of the non-structural component relative to the non-structural component holder when the stop and non-structural component holder are secured to the non-structural component.

In another embodiment, an attachment device for securing a non-structural component of a building to a structural component of the building generally comprises a collar defining a receiving space configured to receive the non-structural component to couple the non-structural component to the attachment device. The collar applies generally no compressive force against the non-structural component when the non-structural component is disposed in the receiving space so that the non-structural component is free to move relative to the collar. A fastening component configured to fix the collar to the non-structural component to inhibit movement of the non-structural component relative to the collar.

BRIEF DESCRIPTION OF THE DRAWINGS

Corresponding reference characters indicate corresponding parts throughout the drawings.

DETAILED DESCRIPTION OF THE DISCLOSURE

Overall, the attachment devices of the various embodiments described herein are for coupling a non-structural component to a structural component via a sway brace or restraint. Broadly, the attachment device and the sway brace/restraint may be considered a sway brace/restraint assembly. The attachment devices can be secured to any suitable restraint or sway brace, such as a longitudinal or lateral sway brace/restraint, or can be secured to any structural element of a building such as a beam, floor, ceiling, for example. The term structural component includes, but is not limited to, a sway brace, a restraint, and building structural elements, such as beams, floors, joists, columns, ceilings, etc. The various attachment devices are each configured to inhibit over-compressing or over-clamping on the particular non-structural component that is to be supported (e.g., braced or restrained) in a building. In this way, the attachment device is configured to inhibit structural damage to the non-structural component due to over-compression or over-clamping. For example, the various attachment devices of the present disclosure allow builders (e.g., construction workers, contractors, etc.) to brace or restrain metal pipes, soft metal pipes (e.g., brass, copper, etc.), plastics and other non-structural components that cannot withstand compressive loads typically applied by conventional sway brace/restraint assemblies in order to prevent the non-structural component from moving relative to the attachment device. The attachment devices of the present disclosure are capable of being secured to a non-structural component in such a manner that prevents over-compression but inhibits movement (e.g., longitudinal, lateral, and/or rotational movement) of the non-structural component.

Figure 1:
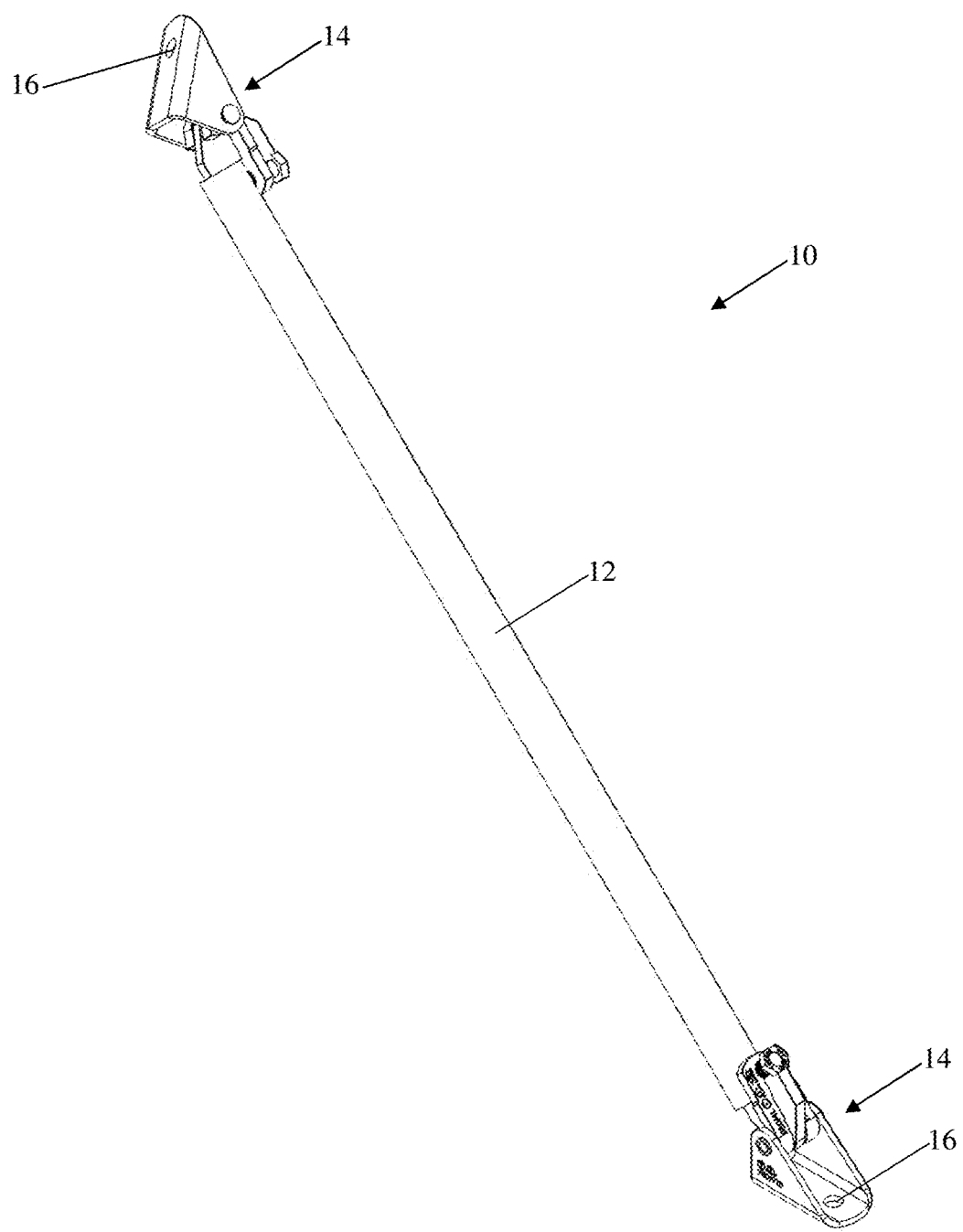
FIG. 1 is a perspective of one example of a sway brace/restraint that can be used with attachment devices of the present disclosure.

Referring to FIG. 1, one example of a suitable sway brace or restraint that can be used with the various attachment devices described herein is generally indicated at reference numeral 10. As generally known in the art, the sway brace/restraint 10 includes a strut 12 (e.g., pipe, bar, rod, etc.) and opposite connection fittings 14 at each end of the strut. One connection fitting 14 is used to attach the sway brace/restraint 10 to a structure (e.g., a beam of a building) and the opposite connection fitting is used to attach the sway brace/restraint to one or more of the various attachment devices described herein. When the attachment device is coupled to the non-structural component, the sway brace/restraint 10 spans between the non-structural component and the building, thereby supporting the non-structural component in the building. In the illustrated embodiment, each of the connection fittings 14 are identical and define a fastener opening 16 that can be used to connect the connection fitting to any one of the various attachment devices, as described in more detail below. Further details of sway braces and restraints may be found in U.S. Pat. No. 6,273,372, hereby incorporated by reference in its entirety. It is understood that the sway brace/restraint 10 in FIG. 1 is illustrative and that the various attachment devices of the present disclosure may be used with any suitable sway brace/restraint. For example, the sway brace/restraint may be a seismic sway brace/restraint. Furthermore, it is contemplated that any one of the various attachment devices described below may be directly connected to the strut 12 of the sway brace/restraint 10 (e.g., replace one of the connection fittings 14 at one end of the strut 12), as is generally known in the art. It is also contemplated that the various attachment device described herein may be directly coupled to a building structural element.

Figure 2:
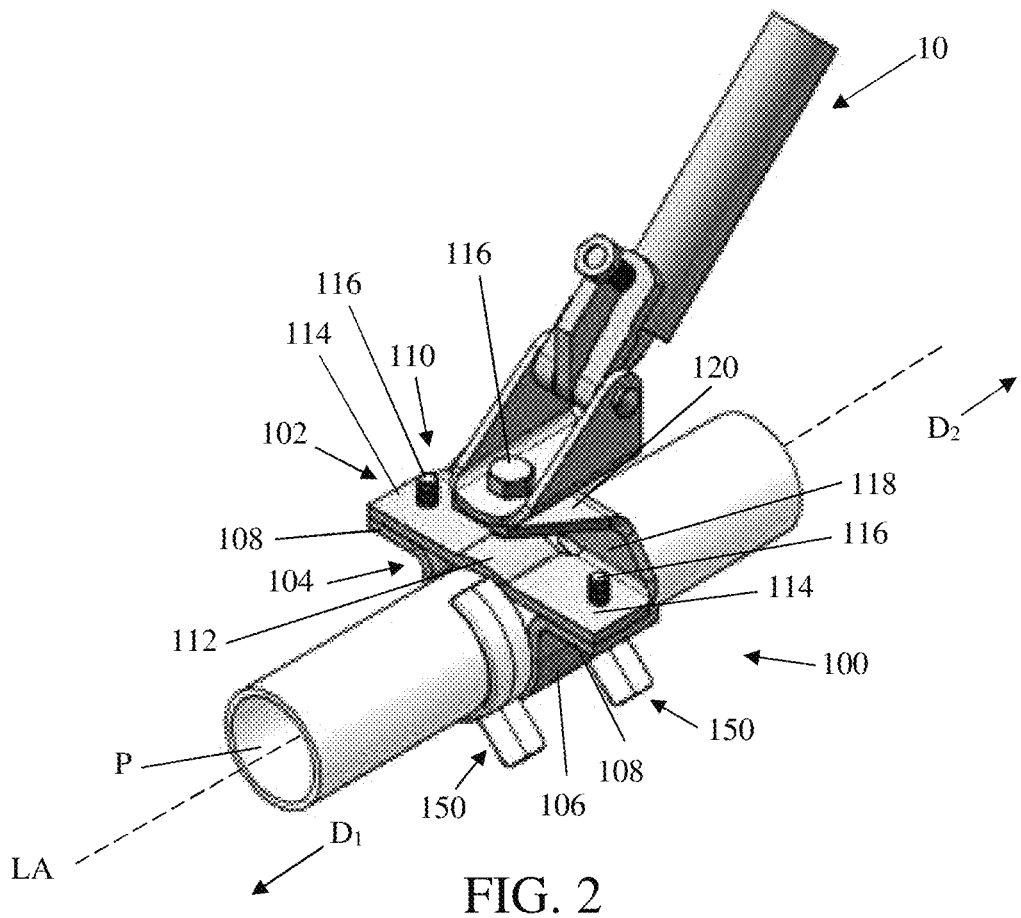
FIG. 2 is a perspective of one embodiment of an attachment device coupling a non-structural component to a structural component according to the teachings of the present disclosure.
Figure 3:
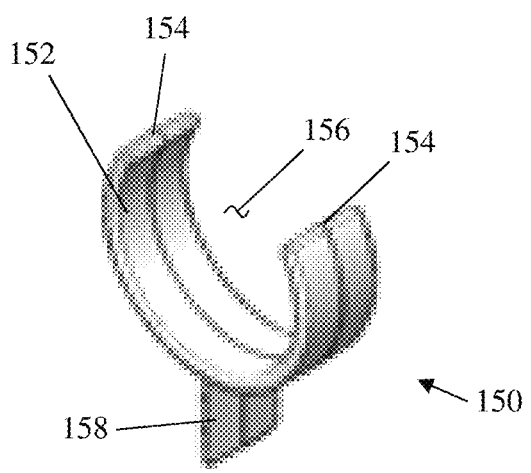
FIG. 3 is a perspective of a stop of the attachment device of FIG. 2.

Referring to FIGS. 2 and 3, one embodiment of an attachment device for coupling a non-structural component to a structural component, such as the sway brace/restraint 10, is generally indicated at reference numeral 100. As shown in FIG. 2, attachment device 100 is configured to be attached to the non-structural component, such as a pipe P, and to the connection fitting 14 of the sway brace/restraint 10. The attachment device 100 includes a non-structural component holder (e.g., a pipe holder), generally indicated at 102, and two stops (broadly, at least one stop), generally indicated at 150. The non-structural component holder 102 is configured to couple to the non-structural component P. The holder 102 includes a strap 104 (broadly, a first strap) having a generally arcuate central portion 106 sized and shaped to extend partially around the perimeter (e.g., circumference) of the non-structural component P and opposite first and second tabs 108 extending outward from opposite ends of the central portion. The tabs 108 are generally co-planar. In the illustrated embodiment, the strap 104 extends around a majority of the perimeter of the non-structural component P, although other configurations are within the scope of the present disclosure. The strap 104 may be formed from a flat piece of metal or other material. The holder 102 also includes a securing member 110 having a generally arcuate central portion 112 sized and shaped to extend partially around the perimeter (e.g., circumference) of the non-structural component P and opposite first and second tabs 114 extending outward from opposite end of the central portion. Broadly, the central portion 112 and tabs 114 may be considered a second strap. Fasteners 116 extend through aligned openings (e.g., threaded openings) in the tabs 108, 114 to secure the securing member 110 and strap 104 together. When connected together, the corresponding tabs 108, 114 engage one another. The securing member 110 may also include an intermediate flange 118 extending upward from side edge margins of the tabs 114. A connection flange or tab 120 (broadly, an attachment component) extends forward from an upper edge margin of the intermediate flange 118. The connection flange 120 is configured to be attached to the sway brace/restraint 10. The connection flange 120 includes an opening (e.g., threaded opening) that receives a fastener 116 to connect the sway brace/restraint 10 to the holder 102. The intermediate flange 118 spaces the connection flange 120 from the central portion 112 and tabs 114 to facilitate the connection of the securing member 110 to the sway brace/restraint 10 via the fastener 116.

Figure 4:
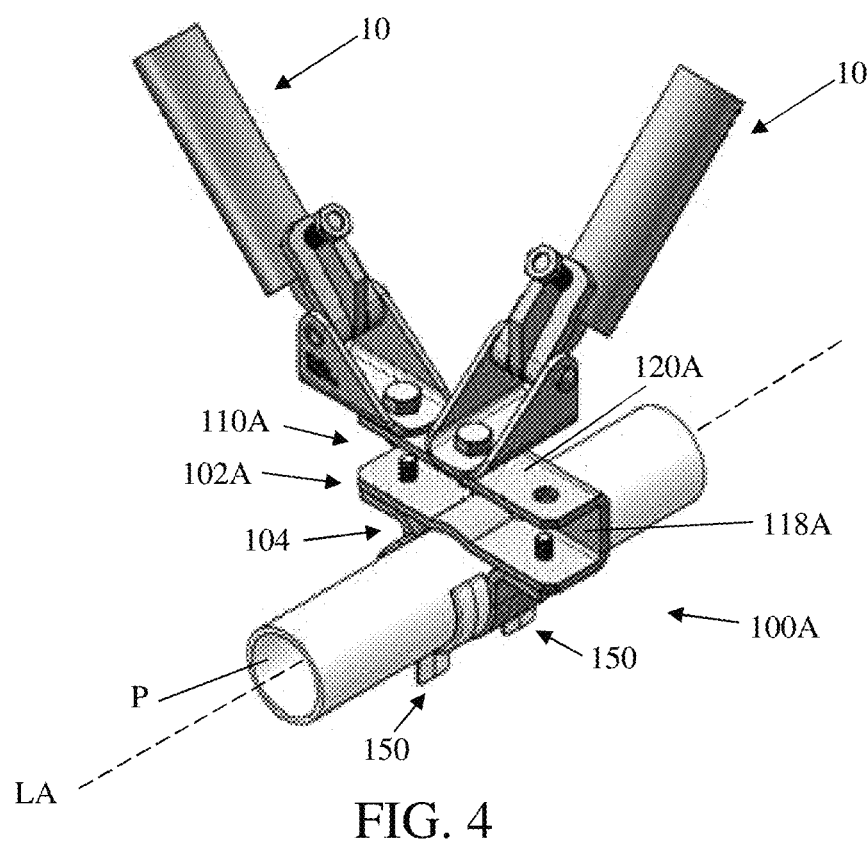
FIG. 4 is a perspective of another embodiment of an attachment device coupling a non-structural component to a structural component according to the teachings of the present disclosure.
Figure 5:
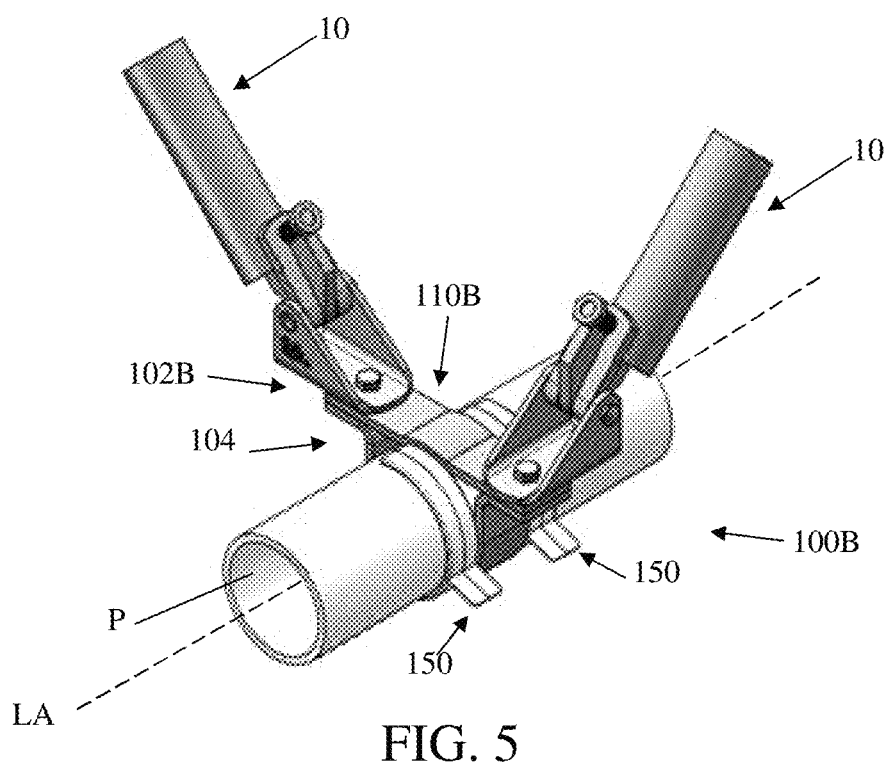
FIG. 5 is a perspective of another embodiment of an attachment device coupling a non-structural component to a structural component according to the teachings of the present disclosure.

Other configurations of the holder 102 are within the scope of the present disclosure. For example, as shown in FIG. 4, an attachment device 100A includes a securing member 110A having a longer connection flange 120A with multiple openings to enable multiple sway braces/restraints 10 to be attached to the holder 102A. In another embodiment, as shown in FIG. 5, an attachment device 100B includes a securing member 110B without connection and intermediate flanges. In this embodiment, the fasteners 116 used to connect the securing member 110B and strap 104 together are also used to connect the sway brace/restraint 10 to the holder 102B. While the attachment devices 100A and 100B are similar to attachment device 100, attachment devices 100, 100A, and 100B are district in certain aspects.

Referring back to FIGS. 2 and 3, together, the strap 104 and securing member 110 define a receiving space of the holder 102. The receiving space receives the non-structural component (e.g., pipe P) to couple the non-structural component to the attachment device 100. The receiving space is sized and shaped to correspond to or be slightly larger than the size and shape (e.g., cross-sectional size and shape) of the non-structural component P. This way, when the non-structural component P is received in the receiving space, the holder 102 (e.g., central portions 106, 112) does not compress the non-structural component. In this manner, the holder 102 applies generally no force (e.g., little to no clamping force) against the non-structural component P when the non-structural component is disposed in the receiving space. Accordingly, the non-structural component P is free to move relative to the holder 102, when the non-structural component is held within the receiving space. Specifically, the non-structural component P has (e.g., defines) a longitudinal axis LA and when the non-structural component is secured in the receiving space of the holder 102, the non-structural component is free to move longitudinally along the longitudinal axis and rotate about longitudinal axis. The holder 102 generally prevents the non-structural component P from moving laterally (e.g., in a direction generally perpendicular to the longitudinal axis LA of the non-structural component). Because the holder 102 applies generally no force against the non-structural component P, the holder does not deform, either plastically or elastically, the non-structural component. In other words, the outer dimension of the non-structural component P at the location where it is being secured to the holder 102 does not change during or after securement.

To inhibit the non-structural component P from moving relative to the holder 102, the attachment device 100 includes stops 150. The stops 150 are configured to be secured to the non-structural component P and engage the non-structural component holder 102 to inhibit the movement of the non-structural component relative to the non-structural component holder when the stop and non-structural component holder are secured to (e.g., mounted on) the non-structural component. In this embodiment, each stop 150 inhibits longitudinal movement of the non-structural component P relative to the holder 102. The attachment device 100 includes two stops 150, with one stop engaging the holder 102 to inhibit longitudinal movement in a first direction $D_1$ and the other stop engaging the holder to inhibit longitudinal movement in a second direction $D_2$ that is generally opposite the first direction. The stops 150 may be formed from a plastic, such as by molding plastic, or other suitable materials. Each stop 150 includes a collar 152 sized and shaped to extend partially around the perimeter (e.g., circumference) of the non-structural component P. In certain exemplary embodiments, the collar 152 is generally arcuate. The collar 152 defines a receiving space 156 of the stop 150 that receives the non-structural component P. The receiving space 156 receives the non-structural component (e.g., pipe P) to couple the non-structural component to the stop 150. The receiving space 156 is sized and shaped to correspond to (e.g., match) the size and shape (e.g., cross-sectional size and shape) of the non-structural component P. In this way, when the non-structural component P is received in the receiving space 156, the stop 150 (e.g., collar 152) does not compress the non-structural component. Preferably, the collar 152 is sized and shaped to extend around at least about half (e.g., at least about 180 degrees) of the perimeter of the non-structural component P. Desirably, the collar 152 is sized and shaped to extend around more than half of the perimeter of the non-structural component P. For example, the collar 152 can extend around from about 50% to about 75% (e.g., from about 180 degrees to about 270 degrees), more desirably from about 50% to about 60% (e.g., from about 180 degrees to about 215 degrees), and even more desirably about 52% (e.g., about 185 degrees) of the perimeter of the non-structural component P.

The collar 152 is configured to hold the stop 150 on the non-structural component P when the collar is mounted on the non-structural component. The collar 152 holds the stop 150 on the non-structural component P because the collar extends around more than half of the perimeter of the non-structural component P. In certain exemplary embodiments, the collar 152 is configured to snap onto the non-structural component P. To mount the stop 150 on the non-structural component P, a user (e.g., construction worker) pushes the collar 152 onto the non-structural component P. The collar 152 is resiliently deflectable and as the collar is pushed onto the non-structural component P, the free ends 154 of the collar deflect away from one other to permit the non-structural component P to pass there-through and into the receiving space 156 of the collar. When the non-structural component P is positioned within the receiving space 156, the free ends 154 return (e.g., snap back) to their original position (FIG. 3), thereby holding the stop 150 on the non-structural component.

The stop 150 includes a fastening component (not shown) that fixes (e.g., permanently attaches) the stop to the non-structural component P when the stop is mounted thereon. The fastening component inhibits the stop 150 (e.g., collar 152) from moving relative to the non-structural component. Otherwise, the stop 150 and non-structural component P would be free to move relative to one another because the collar 152 does not apply a clamping (e.g., gripping) force against the non-structural component to inhibit movement, as mentioned above. In this embodiment, the fastening component can be an adhesive that bonds with the non-structural component P to fix the stop 150 to the non-structural component. The adhesive may comprise at least one of a glue or a double sided tape. Other suitable adhesives are within the scope of the present disclosure. The adhesive may be disposed over all or a portion of the interior surface of the collar 152. As described above, the collar 152 can hold the stop 150 on the non-structural component. This holding allows the adhesive to set (e.g., cure) without a user having to hold the stop 150 on the non-structural component P while the adhesive sets. In other embodiment, the adhesive may be of a type that bonds generally instantaneously with the non-structural component P. Because the stop 150 is fixed to the non-structural component P, the stop moves with the non-structural component.

The stop 150 may also include a break-off tab 158. The break-off tab 158 is connected to and extends from the collar 152. In the illustrated embodiment, the break-off tab 158 extends from generally the middle of the collar 152, although other positions are within the scope of the present disclosure. In certain embodiments, the break-off tab 158 may be configured to be separated from the collar 152 (broadly, a remainder portion of the stop 150) to indicate that the stop is fixed to the non-structural component P. The break-off tab 158 may be a thin piece of material that is easily broken or may include a weakened section (e.g., perforations, thinned material) that is easily broken. The user may remove the break-off tab 158 after the stop 150 is mounted on the non-structural component P. Once the stop 150 is fixed to the non-structural component P, the stop is unable to move relative to the non-structural component. At this point, the user can apply a force to the break off tab 158 to separate the tab from the collar 152. If the stop 150 is not fixed to the non-structural component P (e.g., the adhesive has not set and bonded the stop and non-structural component together), the force applied by the user to remove the break-off tab 158 will result in the stop 150 moving (e.g., rotating) relative to the non-structural component. This movement will prevent the break-off tab 158 from being separated from the collar 152. Accordingly, by being able to remove the break-off tab 158, a visual and mechanical indication is given to the user that the stop 150 is fixed to the non-structural component P. As will become apparent, other configurations of the stop 150 are within the scope of the present disclosure.

To secure the attachment device 100 on the non-structural component P, the non-structural component is positioned in the receiving space of the holder 102 and then the strap 104 and securing member 110 are secured together. As mentioned above, the holder 102 applies generally no force to the non-structural component P and is generally free to move relative to the non-structural component. After the holder 102 is mounted on the non-structural component P, the user positions the stops 150 on the non-structural component on either side of the holder. The stops 150 are adjacent to, and preferably abut, the holder 102. To confirm the stops 150 are fixed to the non-structural component P (e.g., the adhesive has set), the user breaks off the break-off tabs 158. During a seismic event, where movement of the building and its components may occur, the stops 150 move with the non-structural component P and engage the holder 102 (e.g., edges thereof) to prevent the non-structural component from moving longitudinally with respect to the holder.

As used throughout this disclosure, a pipe P is the non-structural component used to facilitate the description of the various embodiments of the attachment devices disclosed herein. It is understood that the attachment devices disclosed herein may be attached to any non-structural component, not just pipes P. Moreover, it is also understood that the attachment devices disclosed herein may be sized and shaped to attach to non-structural components with other exterior shapes (e.g., square, rectangle, I-beam, etc.) than those described herein (e.g., a cylinder-shaped pipe). Moreover, in one or more embodiments, the pipe P is formed from a material other than steel. For example, the pipe P may comprise plastic, such as a thermoplastic material, including but not limited to polyvinyl chloride (PVC), such as chlorinated polyvinyl chloride (CPVC). In another example, the pipe P may comprise copper or other metals that are softer than steel.

Figure 6:
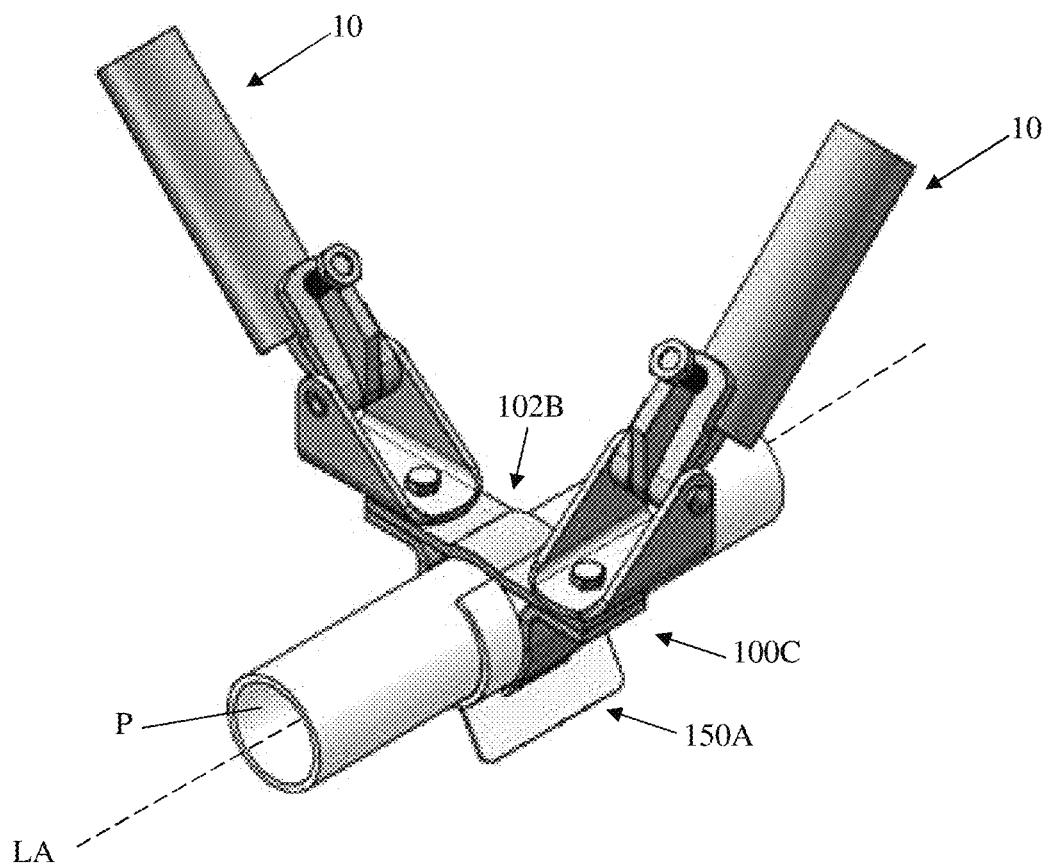
FIG. 6 is a perspective of another embodiment of an attachment device coupling a non-structural component to a structural component according to the teachings of the present disclosure.
Figure 7:
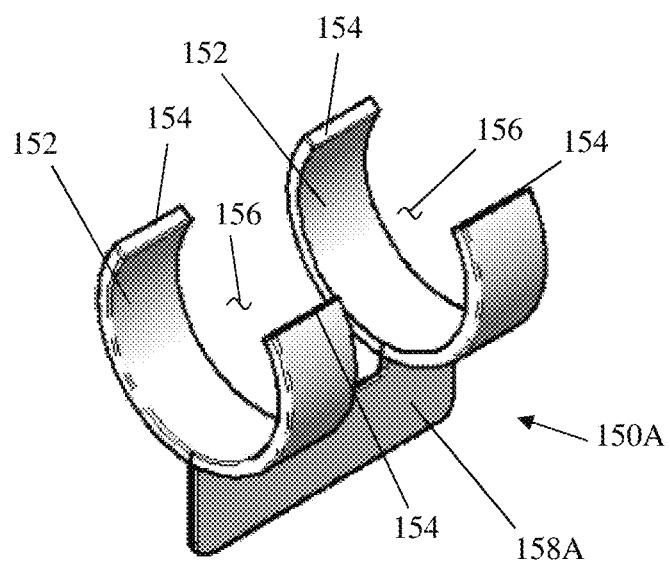
FIG. 7 is a perspective of a stop of the attachment device of FIG. 6.

Referring to FIGS. 6 and 7, another embodiment of the stop is generally indicated at reference number 150A. In this embodiment, stop 150A also inhibits longitudinal movement of the non-structural component P relative to the holder 102B in the first and second directions $D_1$, $D_2$. Stop 150A may be used with any of the holders (e.g., holder 102) described herein. While stop 150A is similar to stop 150, it is district from stop 150 in certain aspects. For example, stop 150A includes two collars 152 connected together by a break-off tab 158A. Accordingly, in this embodiment, attachment device 100C only needs one stop 150A, instead of two stops 150, to inhibit the longitudinal movement of the non-structural component P relative to the holder 102B in the first and second directions $D_1$, $D_2$. The break-off tab 158A spaces apart the two collars 152 by a distance generally equal to the width of the holder 102B. This allows the user to attach both collars 152 on either side of the holder 102B at the same time. In this embodiment, the break-off tab 158A includes a recess to provide clearance for the holder 102B when the stop 150A is mounted on the non-structural component P. In certain exemplary embodiments, the break-off tab 158A is configured to be separated from the collars 152 to provide an indication that the stop 150A is fixed to the non-structural component.

Figure 8:
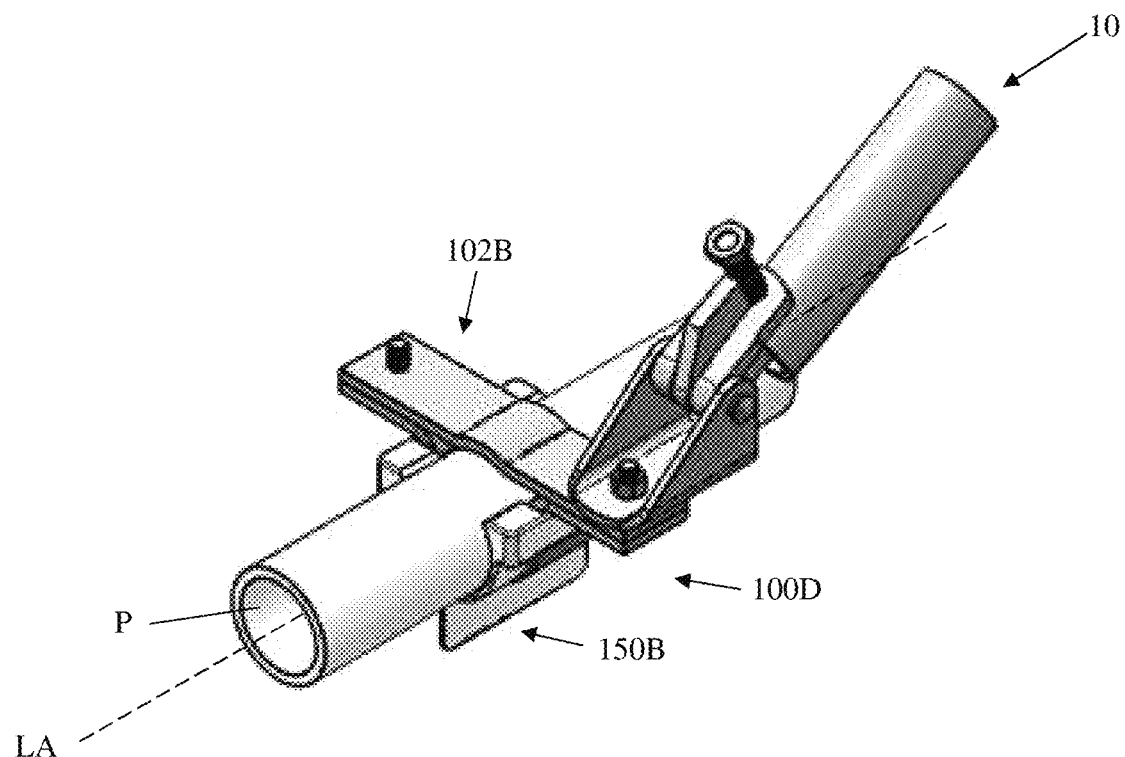
FIG. 8 is a perspective of another embodiment of an attachment device coupling a non-structural component to a structural component according to the teachings of the present disclosure.
Figure 9:
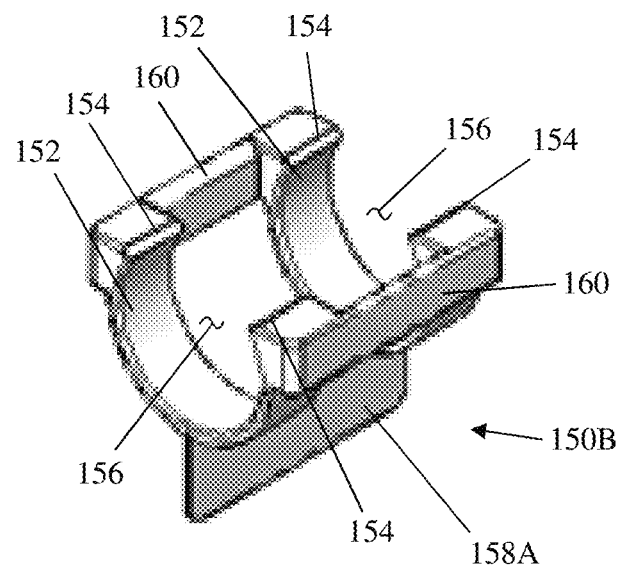
FIG. 9 is a perspective of a stop of the attachment device of FIG. 8.
Figure 10:
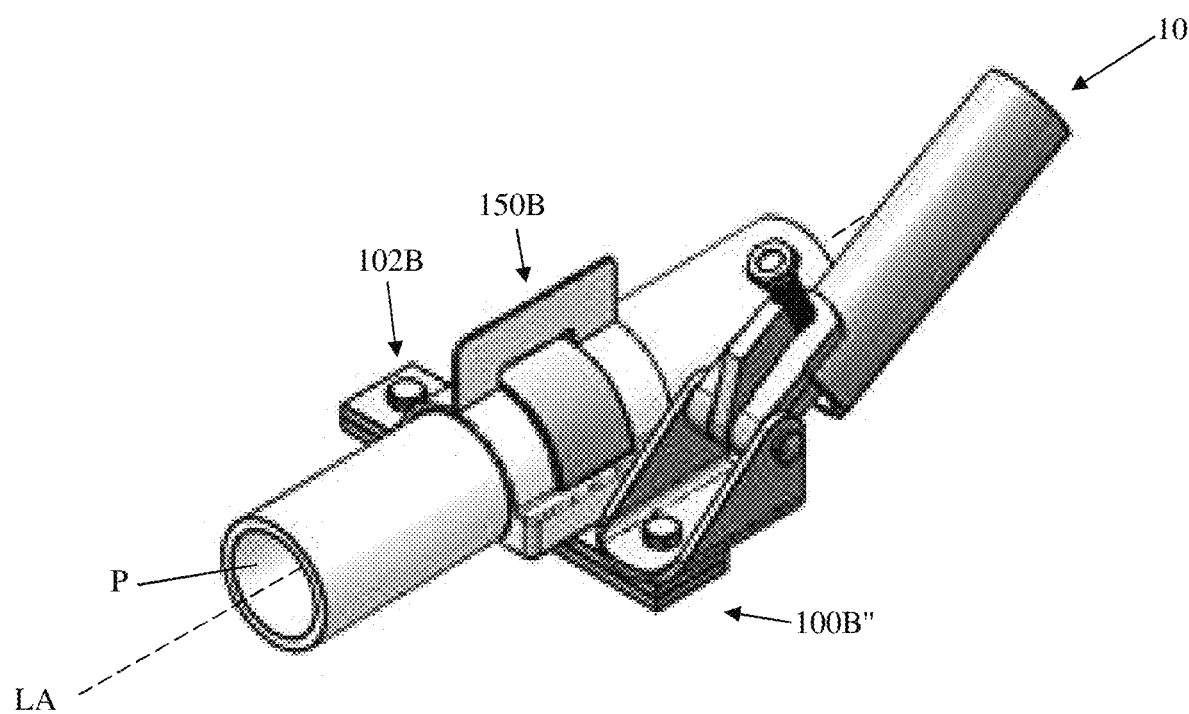
FIG. 10 is a perspective of the attachment device of FIG. 8 coupled to the non-structural component in an inverted orientation.

Referring to FIGS. 8-10, another embodiment of the stop is generally indicated at reference number 150B. Stop 150B may be used with any of the holders (e.g., holder 102) described herein. In this embodiment, attachment device 100D includes stop 150B and holder 102B. While stop 150B is similar to stop 150A, stop 150B is distinct from stop 150A in certain aspects. For example, inhibits rotational movement of the non-structural component P relative to the holder 102B. Accordingly, stop 150B inhibits both rotational and longitudinal movement of the non-structural component P. In particular, stop 150B inhibits rotational movement in both the clockwise and counter-clockwise directions, about the longitudinal axis LA. Stop 150B includes first and second braces 160 configured to inhibit rotational movement of the non-structural component P relative to the holder 102B. Specifically, as shown in FIG. 8, one brace 160 engages the holder 102B (specifically, one of the tabs 108) to inhibit rotation in the clockwise direction and the other brace engages the holder (specifically, the other tab) to inhibit rotation in the counter-clockwise direction. Each brace 160 spans between (e.g., spaces apart) the collars 152 and has an upper edge margin that engages the holder 102B to inhibit rotation. In the illustrated embodiment, an upper edge margin of each brace 160 is co-planar with the free ends 154 of the collars 152, although the braces may be at other positions to conform to holders having other configurations. Each brace 160 is offset (e.g., radially offset) outward from the collars 152. This creates space to allow the holder 102 to extend between each brace 160 and the non-structural component P, as shown in FIGS. 8 and 10. As shown in FIG. 10, the attachment device 100D may be secured to the non-structural component P in an inverted position. Any of the attachment devices described herein may be secured to the non-structural component P in an inverted position or any other position, as desired.

Figure 11:
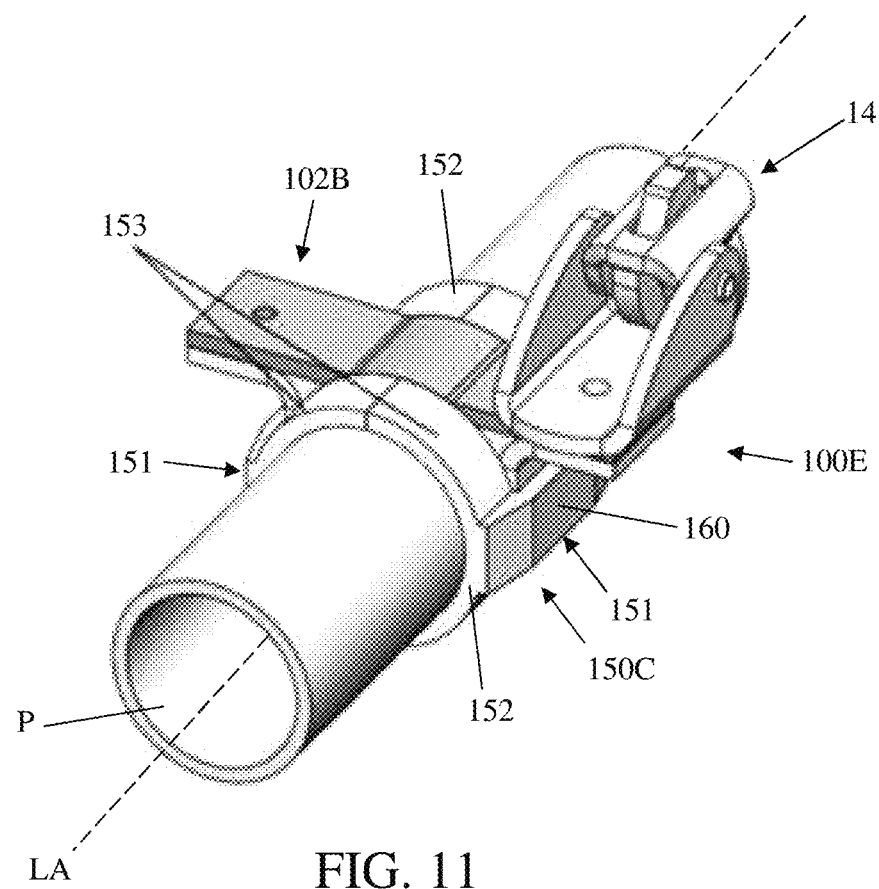
FIG. 11 is a perspective of another embodiment of an attachment device coupling a non-structural component to a structural component according to the teachings of the present disclosure.
Figure 12:
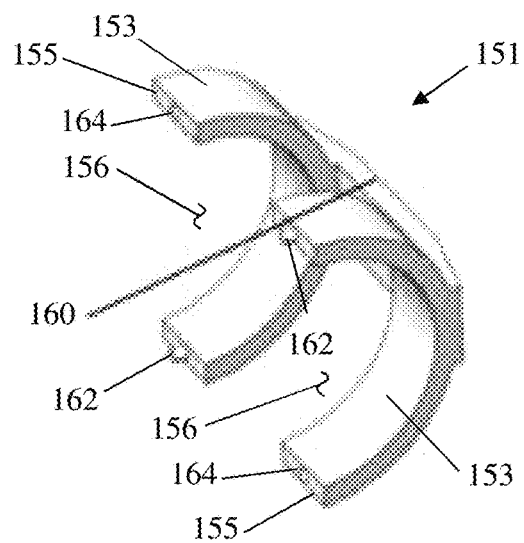
FIG. 12 is a perspective of a portion of a stop of the attachment device of FIG. 11.

Referring to FIGS. 11 and 12, another embodiment of the stop is generally indicated at reference number 150C. Stop 150C may be used with any of the holders (e.g., holder 102) described herein. In this embodiment, attachment device 100E includes stop 150C and holder 102B. Similar to stop 150B, stop 150C also inhibits longitudinal and rotational movement of the non-structural component P relative to the holder 102B. Similar to stop 150B, stop 150C includes two collars 152 joined by braces 160. The collars 152 and braces 160 inhibit longitudinal and rotational movement as described above. However, in this embodiment, the stop 150B is comprised of two separate stop portions 151 that are joined together on the non-structural component P. Each stop portion 151 includes one of the braces 160 and two collar portions 153. The collar portions 153 are spaced apart by the brace 160. It is understood the brace 160 may be of generally any lengths and height to correspond to the size and shape of a particular holder. Each collar portion 153 extends around half (e.g., 180 degrees) of the perimeter (e.g., circumference) of the non-structural component P. One free end 155 of each collar portion 153 includes a projection 162 and the other free end of each collar portion includes a recess 164 (e.g., hole). Each projection 162 of one collar portion 153 is received in a corresponding recess 164 of another collar portion 153 to align the collar portions (and stop portions 151) when the stop portions are mounted (e.g., fixed via the fastening component) to the non-structural component P. As shown in FIG. 11, each collar 152 is made up of two collar portions 153. When the stop portions 151 are secured on the non-structural component P and joined together, the collars 152 extend around the entire perimeter of the non-structural component. In this embodiment, the stop portions 151 do not snap onto the non-structural component P. Instead, the stop portions 151 are held on the non-structural component P until the fastening component fixes the stop portions on the non-structural component (e.g., until the adhesive sets). Alternatively, the projections 162 and recess 164 may be configured to form an interlocking relationship to hold the stop portions 151 together and on the non-structural component P until the fastening component fixes the stop 150C thereon. In the illustrated embodiment, the stop 150C does not include a break-off tab, however one may be included if desired.

Figure 13:
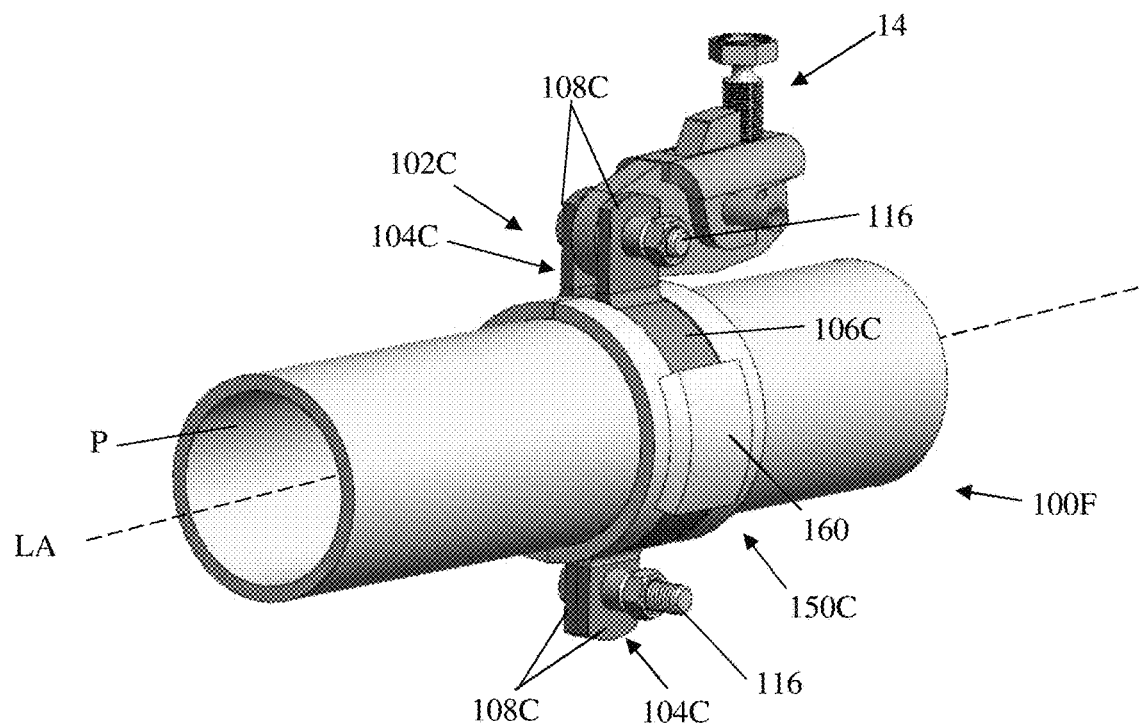
FIG. 13 is a perspective of another embodiment of an attachment device coupling a non-structural component to a structural component according to the teachings of the present disclosure, the attachment device using the portion of the stop of FIG. 12.

Referring to FIG. 13, another embodiment of an attachment device is generally indicated at reference number 100F. The attachment device 100F includes stop 150C, as described above, and non-structural component holder 102C. The holder 102C includes first and second straps 104C. Each strap 104C has a generally arcuate central portion 106C sized and shaped to extend partially around the perimeter (e.g., circumference) of the pipe P and opposite first and second tabs 108C extending outward from opposite ends of the central portion. The tabs 108C are generally co-planar. In the illustrated embodiment, each strap 104C extends around about half of the perimeter of the pipe P, although other configurations are within the scope of the present disclosure. Fasteners 116 extend through aligned openings (e.g., threaded openings) in the tabs 108C to secure the straps 104C together and to the sway brace/restraint 10. In this embodiment, the connection fitting 14 of the sway brace/restraint 10 is disposed between tabs 108C. As with the other holders described herein, holder 102C applies little to no force against the non-structural component P. In this embodiment, stop 150C inhibits longitudinal movement (in the first and second directions) of the non-structural component P relative to the holder 102C, as described above, and limits the amount of the rotational movement of the non-structural component relative to the holder. Because the brace 160 is not positioned adjacent to or abutting one of the tabs 108C (e.g., the tab is spaced apart from the brace) the non-structural component P is free to rotate relative to the holder 102C until one of the braces of the stop 150C, which is fixed to the non-structural component by the fastening component, engages one of the tabs. According, the amount of rotation the stop 150C permits will depend on the space between brace 160 and the tab 108C (broadly, will depend upon the particular configuration of the stop and holder).

Figure 14:
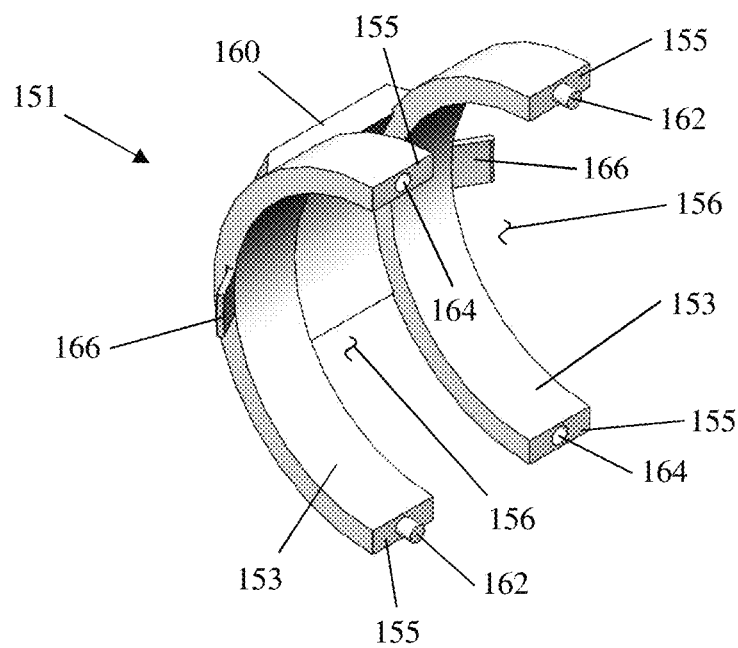
FIG. 14 is a perspective of another embodiment of the portion of the stop of FIG. 12.
Figure 15:
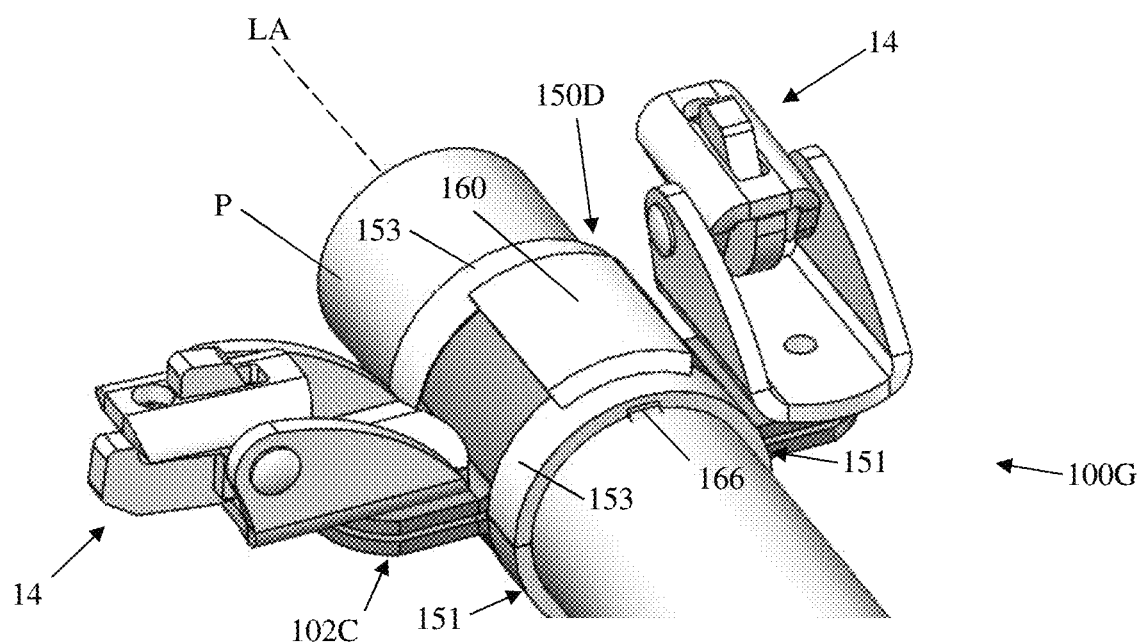
FIG. 15 is a perspective of another embodiment of an attachment device coupling a non-structural component to a structural component according to the teachings of the present disclosure, the attachment device using the portion of the stop of FIG. 14.

Referring to FIGS. 14 and 15, another embodiment of an attachment device is generally indicated at reference number 100G. The attachment device 100G includes stop 150D and non-structural component holder 102C, described above. In this embodiment, the connection fitting 14 of the sway brace/restraint 10 is disposed above the tabs 108C, rather than between tabs 108C. While stop 150D is similar to stop 150C, stop 150D is distinct in certain aspects. For example, stop 150 includes two (broadly, at least one) resiliently deflectable tab 166 on each stop portion 151. Each deflectable tab 166 is connected to one of the collar portions 153. Each deflectable tab 166 is configured to engage the non-structural component P and be deflected by the non-structural component when the stop portion 151 is attach thereto. When the stop portion 151 is mounted on the non-structural component P, the deflection of each deflectable tab 166 causes the tab to apply a lifting force against the non-structural component. The lifting force applied by the deflectable tabs 166 is insufficient to move the stop portion 151 away from the non-structural component P when the stop portion is fixed to the non-structural component. If the stop portion 151 is fixed, via the fastening component, to the non-structural component P, the stop portion will remain mounted on the non-structural component regardless of the lifting force applied by the deflectable tabs 166. If the stop portion 151 is not fixed to the non-structural component P, the lifting force applied by the deflectable tabs 166 will cause the stop portion to move away and disconnect from the non-structural component. In this manner, the deflectable tabs 166 indicate whether or not the stop 150D is fixed to the non-structural component P. Again, in this embodiment, stop 150C inhibits longitudinal movement (in the first and second directions $D_1$, $D_2$) of the non-structural component P relative to the holder 102C, as described above, and limits the amount of the rotational movement of the non-structural component relative to the holder, as described above.

It is understood that certain aspects of attachment devices 100-100G are similar Therefore, many of the teachings herein regarding one attachment device may apply interchangeably to another attachment device without departing from the scope and inventive aspects of this disclosure.

Figure 16:
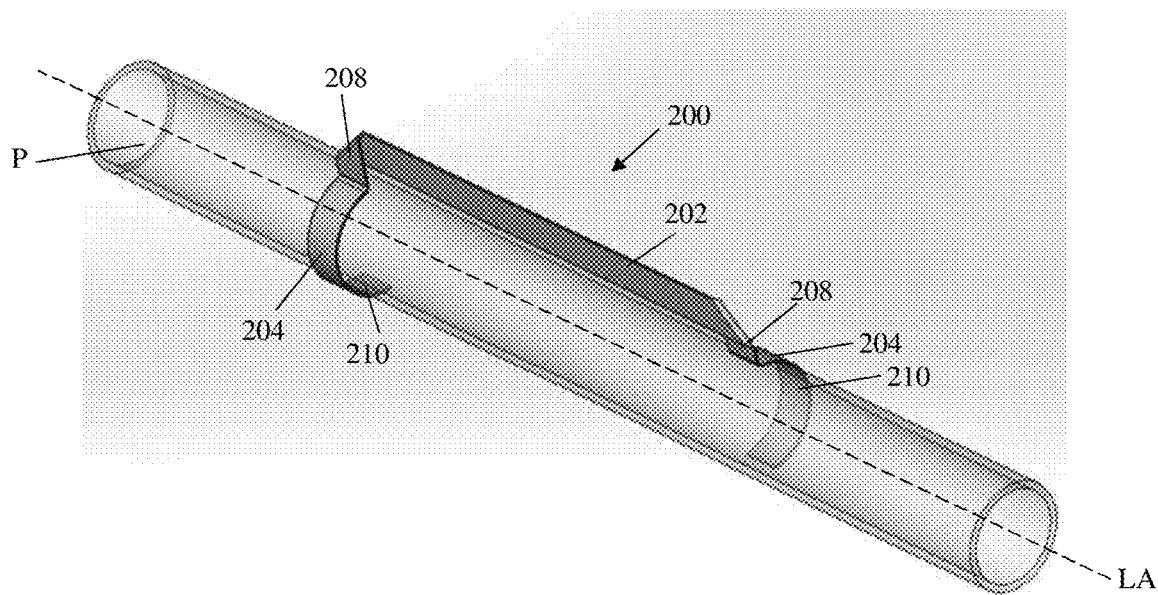
FIG. 16 is a perspective of another embodiment of an attachment device coupled to a non-structural component according to the teachings of the present disclosure.

Referring to FIG. 16, another embodiment of an attachment device is generally indicated at reference numeral 200. The attachment device 200 is configured to be attached to non-structural components P and to a structural component such as a sway brace/restraint 10. The attachment device 200 includes a central flange or tab 202 and opposite generally arcuate portions (e.g., collars) 204 sized and shaped to extend partially around the perimeter (e.g., circumference) of the pipe P extending from opposite ends of the central flange. The arcuate portions 204 are generally mirror images of one another about a vertical plane defined by the central flange 202. In the illustrated embodiment, each arcuate portions 204 extend around about half of the perimeter (e.g., circumference) of the non-structural component P, although other configurations are within the scope of the present disclosure. Each arcuate portion 204 defines a receiving space that receives the non-structural component to couple the non-structural component to the attachment device 200. The receiving space is sized and shaped to correspond to (e.g., generally match) the size and shape (e.g., cross-sectional size and shape) of the non-structural component P. This way, when the non-structural component P is received in the receiving space, the arcuate portions 204 engage the outer surface of the non-structural component. In the illustrate embodiment, respective intermediate flanges 208 interconnect each arcuate portion 204 to the central flange 204. The central flange may include (e.g., define) an opening (e.g., threaded opening) that receives a fastener 116 to connect the attachment device 200 to the sway brace/restraint. The attachment device 200 may be formed from a flat piece of metal or other suitable material.

The attachment device 200 includes a fastening component to fix (e.g., permanently attach) the attachment device, specifically the arcuate portions 204, to the non-structural component P. In the illustrated embodiment, the fastening component is adhesive 210 (green), as described above. The adhesive 210 bonds with the non-structural component P to fix the attachment device to the non-structural component. The adhesive 210 may be disposed over all or a portion of each arcuate portion 204. Accordingly, because the attachment device 200 is fixed to the non-structural component P with adhesive 210, the attachment device 200 does not compress the non-structural component. In this manner, the attachment device applies generally no force (e.g., little to no clamping force) against the non-structural component P when the non-structural component is disposed in the receiving space. Moreover, because the attachment device 200 is fixed to the non-structural component P via the adhesive, the attachment device generally inhibits the non-structural component P from moving (e.g., longitudinally, laterally and rotationally) relative to the sway brace/restraint 10.

To fix the attachment device 200 to the non-structural component P, the attachment device is positioned over the non-structural component. The attachment device 200 is then moved (e.g., rotated) to bring the arcuate portions 204 into contact with the non-structural component P (e.g., the non-structural component is moved into the receiving spaces). This brings the adhesive 210 into contact with the outer surface of the non-structural component P. The attachment device 200 is held (e.g., manually held) in this position until the adhesive sets. In other embodiments, the arcuate portions 204 may extend greater than half way around the perimeter of the non-structural component P so that the arcuate portions snap onto the non-structural component and hold the attachment device 200 on the non-structural component while the adhesive sets, as described above. Once the adhesive sets, the attachment device 200 is fixed to the non-structural component. The attachment device 200 may be attached in generally any desired orientation around the non-structural component P.

Figure 17:
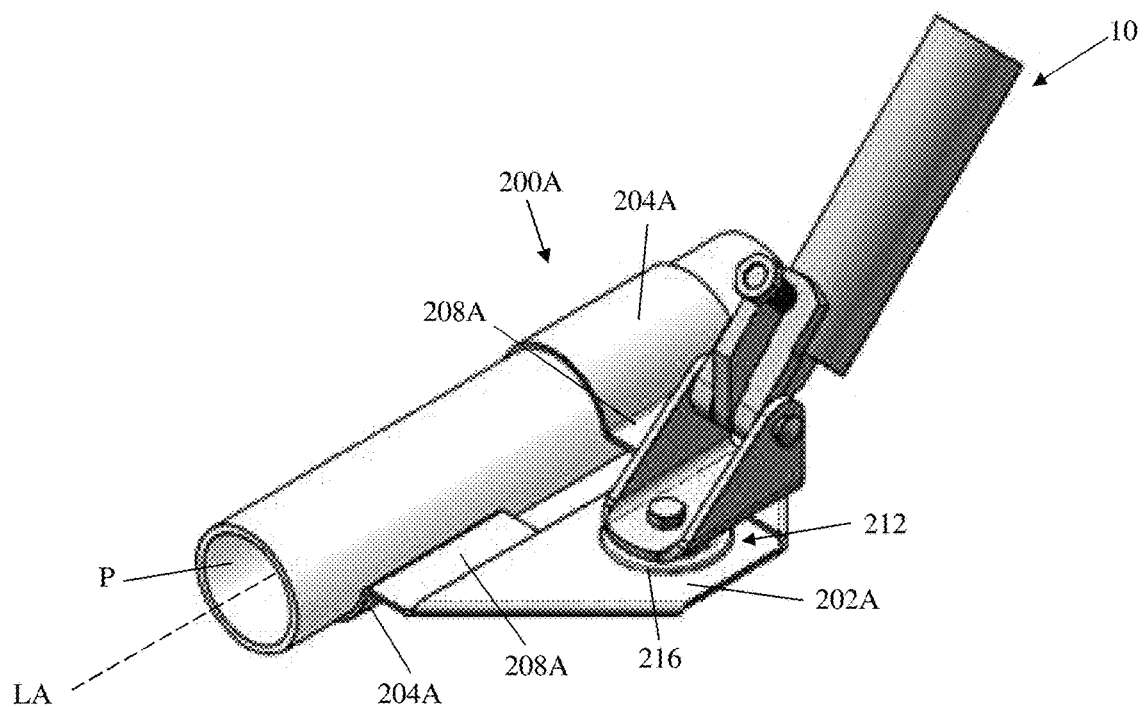
FIG. 17 is a perspective of another embodiment of an attachment device coupling a non-structural component to a structural component according to the teachings of the present disclosure.
Figure 18:
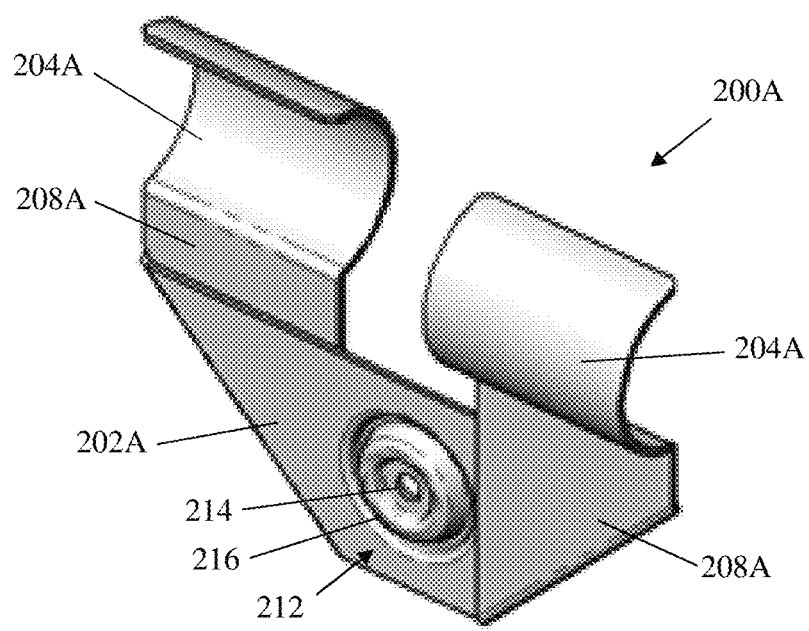
FIG. 18 is a perspective of the attachment device of FIG. 17.

Other configurations of the attachment device 200 are within the scope of the present disclosure. For example, as shown in FIGS. 17-18, an attachment device 200A has a central flange 202A that includes a boss 212 defining the opening 214 used to the connect the attachment device 200A to the sway brace/restraint 10. The boss 212 includes portions that extend outward from each face of the central flange 202A. In certain embodiments, the boss 212 includes two concentric ribs 216 encircling the opening 214, one rib extending outward from one face and the other rib extending outward from the other face. The boss 212 strengthens and stiffens the central flange 202A. In addition, in this embodiment, the central flange 202A, arcuate portions 204A, and intermediate flanges 208A are generally wider that the corresponding components of attachment device 200, although other dimensions are within the scope of the present disclosure.

Figure 19:
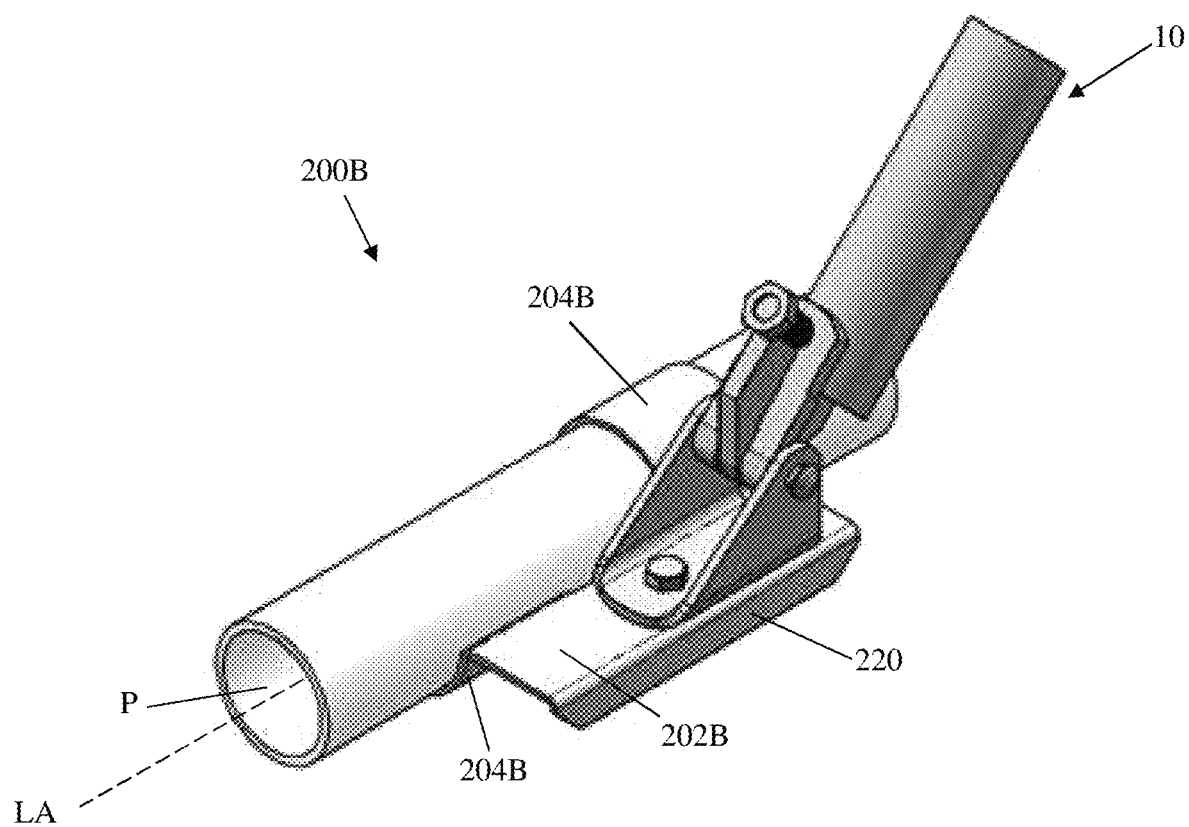
FIG. 19 is a perspective of another embodiment of an attachment device coupling a non-structural component to a structural component according to the teachings of the present disclosure.
Figure 20:
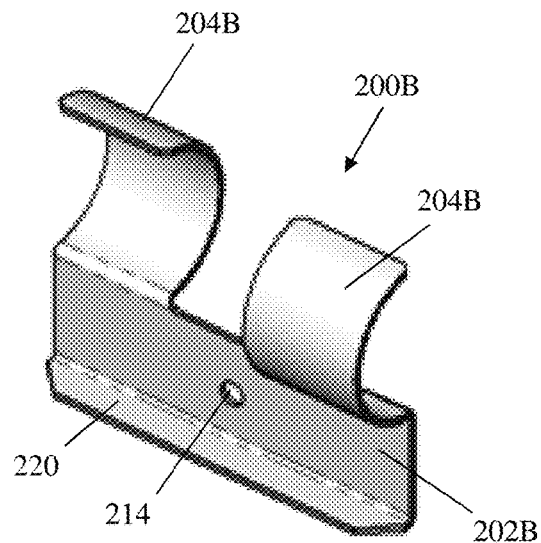
FIG. 20 is a front perspective of the attachment device of FIG. 19.
Figure 21:
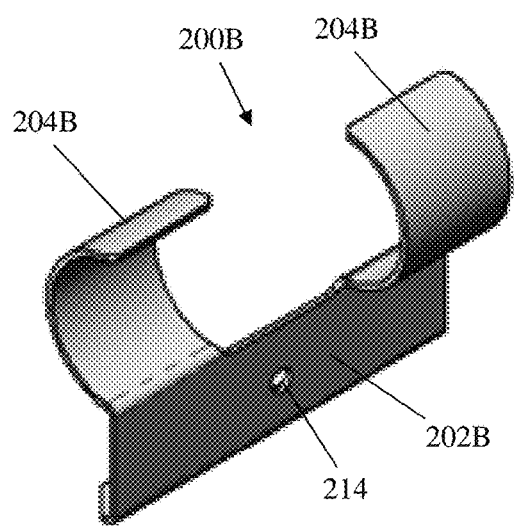
FIG. 21 is a rear perspective of the attachment device of FIG. 19.
Figure 22:
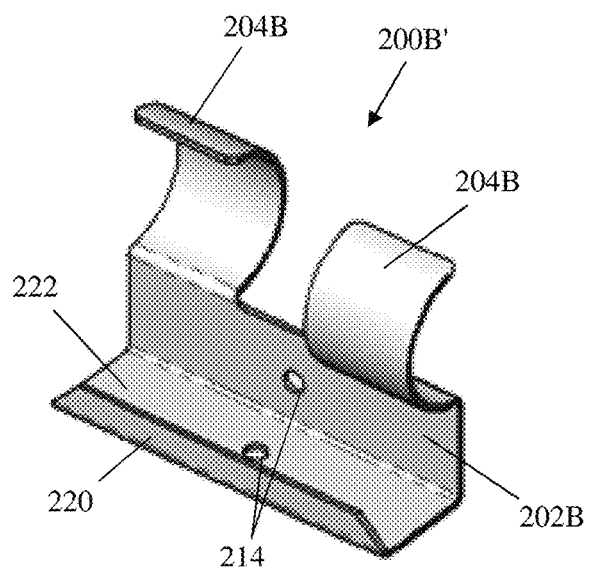
FIG. 22 is a perspective of another embodiment of an attachment device according to the teachings of the present disclosure.

Referring to FIGS. 19-21, another embodiment of the attachment device is generally indicated at reference numeral 200B. While attachment device 200B is similar to attachment device 200, attachment device 200B is distinct from attachment device 200. For example, the arcuate portions 204B extend from a side edge margin of the central flange 202B (e.g., the attachment device does not have intermediate flanges). In addition, the attachment device 200B includes a stiffing rib or flange 220 extending downward from the other side edge margin (e.g., the side edge margin opposite the arcuate portions) of the central flange. The stiffing flange 220 generally strengthens and stiffens the central flange 202B. The central flange 202B and arcuate portions 204B are also generally wider than the corresponding components of attachment device 200, although other dimensions are within the scope of the present disclosure. While the attachment device 200B is similar to attachment device 200, attachment device 200B is distinct from attachment device 200. Other configurations of attachment device 200B are within the scope of the present disclosure. For example, in one embodiment, shown in FIG. 22, the attachment device 200B' includes a secondary flange 222 extending from the side edge margin of the central flange 202B. The secondary flange 222 defines an opening 214 that can be used to attach the attachment device 2003 to an additional sway brace/restraint 10. In this embodiment, a stiffing flange 220 extends from the secondary flange 222.

Figure 23:
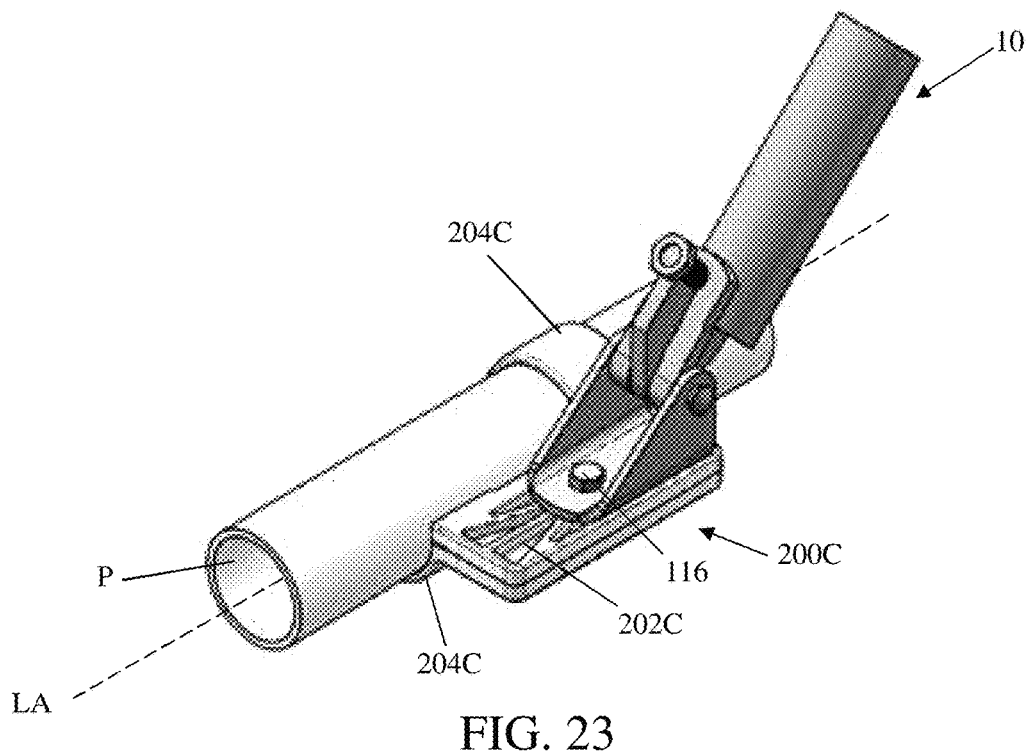
FIG. 23 is a perspective of another embodiment of an attachment device coupling a non-structural component to a structural component according to the teachings of the present disclosure.
Figure 24:
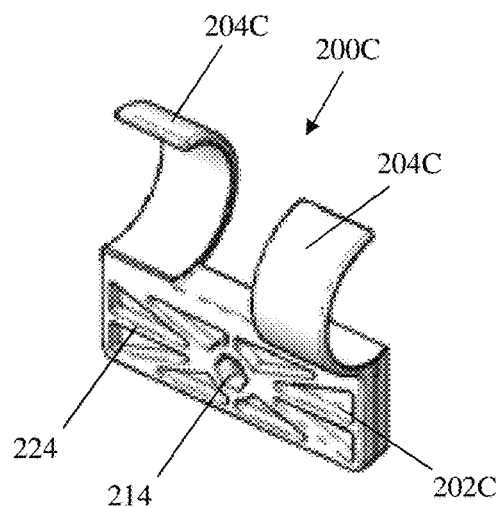
FIG. 24 is a front perspective of the attachment device of FIG. 23.
Figure 25:
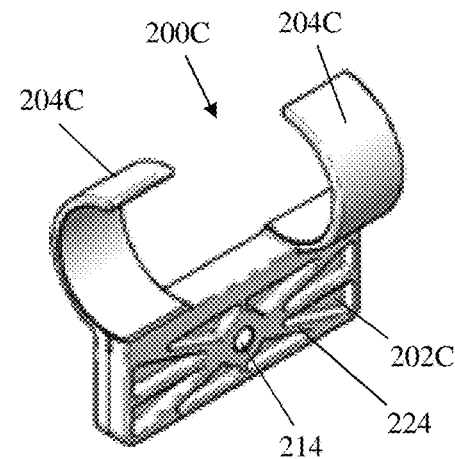
FIG. 25 is a rear perspective of the attachment device of FIG. 23.

Referring to FIGS. 23-25, another embodiment of the attachment device is generally indicated at reference numeral 200C. While attachment device 200C may be configured in a manner similar to attachment device 200B, attachment device 200C is distinct from attachment device 200B in several aspects. For example, attachment device 200C is formed from molded plastic. Accordingly, in order to strengthen and stiffen the central flange 202C, the central flange 202C includes a plurality of ribs 224 on the upper and lower sides of the flange. The ribs 224 may be of generally any configuration. In addition, at least a portion of the opening 214 (FIG. 24) that receives the fastener 116 has a polygonal (e.g., hexagonal) cross-sectional shape to correspond to the polygonal cross-sectional shape of a nut (not shown) threaded onto the fastener to prevent the nut from rotating relative to the fastener. Otherwise, attachment device 200C is generally the same at attachment device 200B and functions in the same way.

It is understood that attachment devices 200-200*c* are similar and that one having ordinary skill in the art understands the teachings regarding one attachment device may apply equally to another attachment device.

Figure 26:
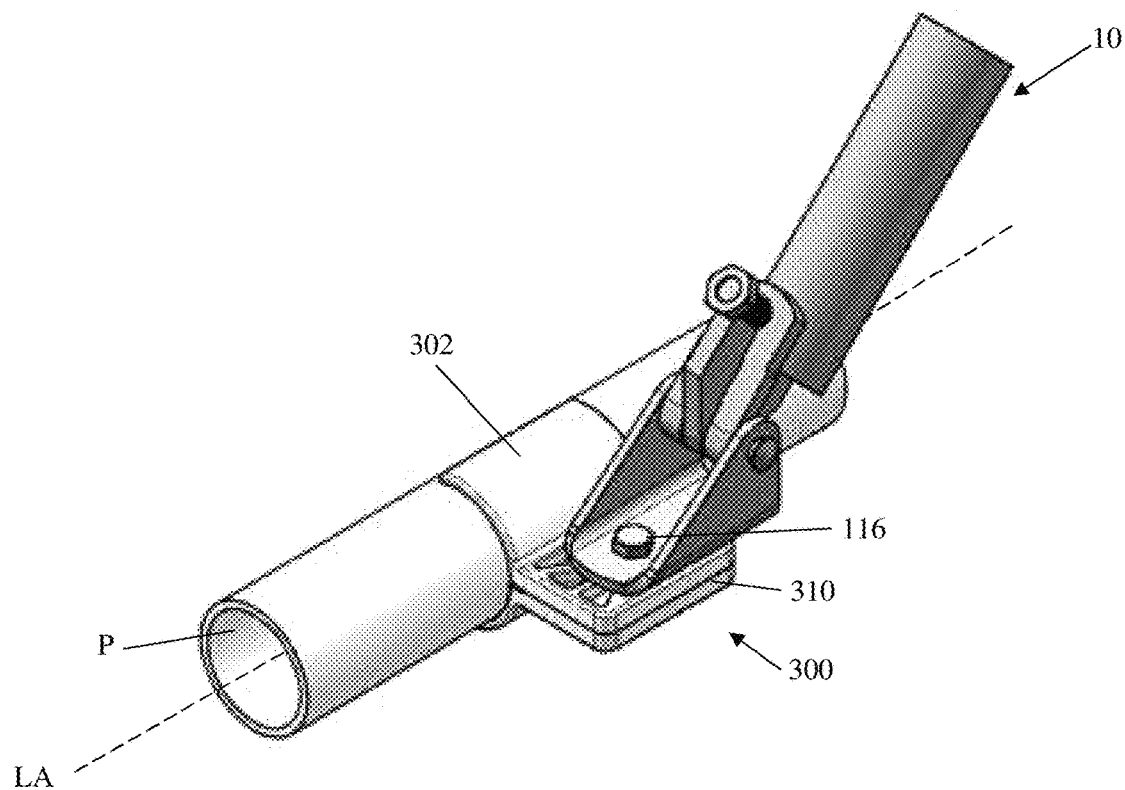
FIG. 26 is a perspective of another embodiment of an attachment device coupling a non-structural component to a structural component according to the teachings of the present disclosure.
Figure 27:
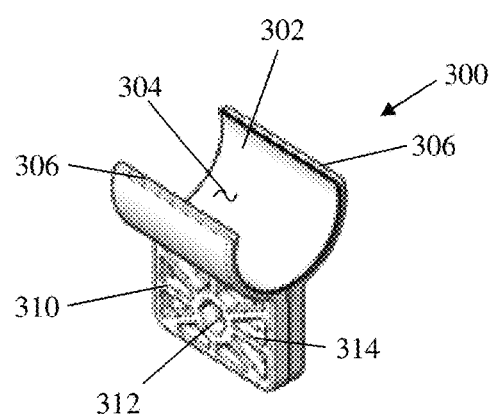
FIG. 27 is a front perspective of the attachment device of FIG. 26.
Figure 28:
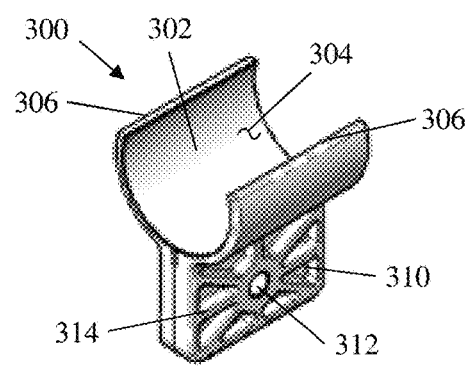
FIG. 28 is a rear perspective of the attachment device of FIG. 26.
Figure 29:
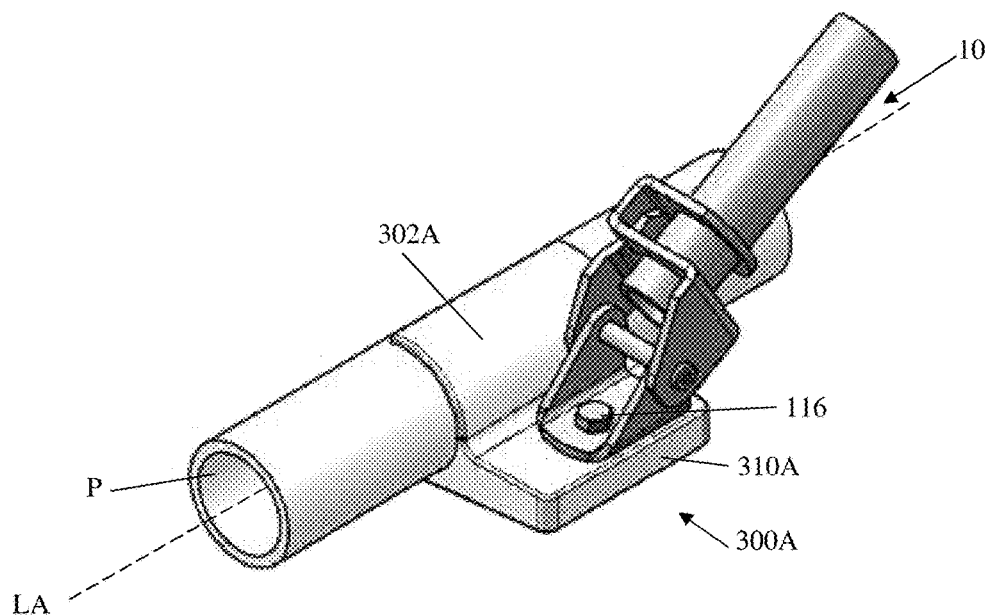
FIG. 29 is a top perspective of another embodiment of an attachment device coupling a non-structural component to a structural component according to the teachings of the present disclosure.
Figure 30:
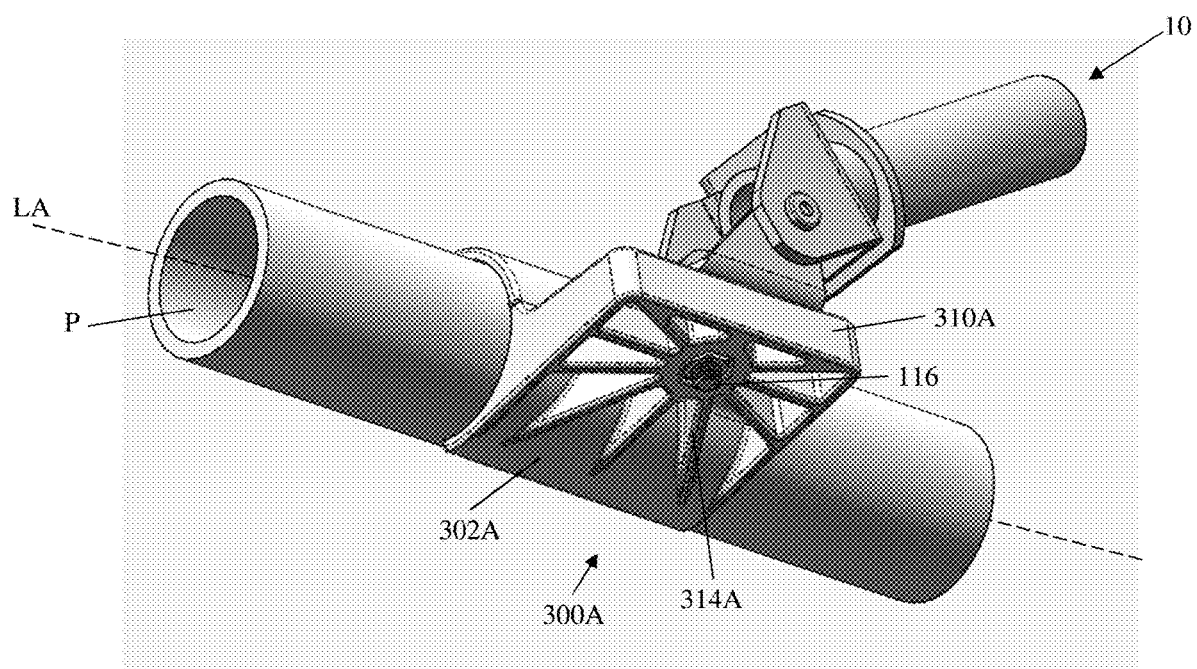
FIG. 30 is a bottom perspective thereof.
Figure 31:
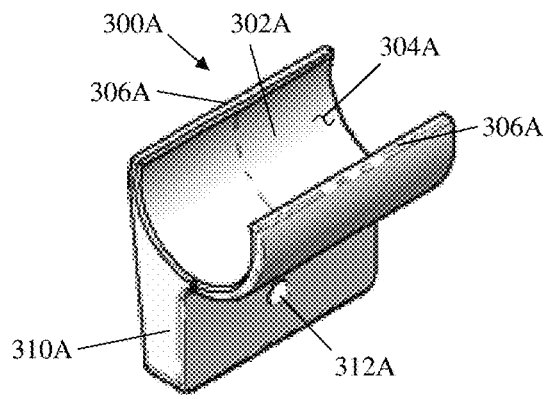
FIG. 31 is a front perspective of the attachment device of FIG. 26.
Figure 32:
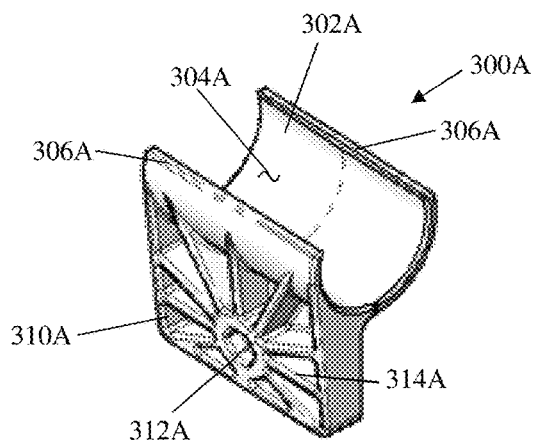
FIG. 32 is a rear perspective of the attachment device of FIG. 26.

Referring to FIGS. 26-28, another embodiment of the attachment device for coupling a non-structural component P to a structural component, such as the sway brace/restraint 10, is generally indicated at reference numeral 300. As with the other attachment devices described herein, attachment device 300 is configured to be attached to the non-structural component, such as a pipe P, and to the connection fitting 14 of the sway brace/restraint 10. The attachment device 100 includes a collar 302 and a connection flange or tab 310. The collar 302 is configured to couple to the non-structural component P. The collar 302 is generally arcuate. The collar 302 defines a receiving space 304 of the attachment device 300 that receives the non-structural component P. The receiving space 304 receives the non-structural component (e.g., pipe P) to couple the non-structural component to the attachment device 300. The receiving space 304 is sized and shaped to correspond to (e.g., match) the size and shape (e.g., cross-sectional size and shape) of the non-structural component P. This way, when the non-structural component P is received in the receiving space 304, the attachment device 300 (e.g., collar 302) does not compress the non-structural component. In this manner, the collar 302 (broadly, the attachment device 300) applies generally no force (e.g., little to no clamping force) against the non-structural component P when the non-structural component is disposed in the receiving space 304. Accordingly, the non-structural component P is generally free to move relative to the collar 302, when the non-structural component is held within the receiving space 304. Specifically, the non-structural component P is able to move longitudinally along the longitudinal axis LA and is able to rotate about longitudinal axis. The collar 302 generally prevents the non-structural component P from moving laterally. As with the other attachment devices (specifically, the collars, holders, arcuate portions, etc.), because the collar 302 applies generally no force against the non-structural component P, the collar does not deform, either plastically or elastically, the non-structural component.

The collar 302 sized and shaped to extend partially around the perimeter (e.g., circumference) of the non-structural component P. Preferably, the collar 302 is sized and shaped to extend around at least half (e.g., at least 180 degrees) of the perimeter of the non-structural component P. Desirably, the collar 302 is sized and shaped to extend around more than half of the perimeter of the non-structural component P. For example, the collar 302 can extend around between about 50%-75% (e.g., about 180 degrees to 270 degrees), more desirably about 50%-60% (e.g., about 180 degrees to 216 degrees), and even more desirably about 52% (e.g., about 185 degrees) of the perimeter of the non-structural component P.

The collar 302 is configured to hold the attachment device 302 on the non-structural component P when the collar is mounted on the non-structural component. The collar 302 holds the attachment device 300 on the non-structural component P because the collar extends around more than half of the perimeter of the non-structural component P. In particular, the collar 302 is configured to snap onto the non-structural component P. To mount the attachment device 300 to the non-structural component P, a user (e.g., construction worker) pushes the collar 302 onto the non-structural component. The collar 302 is resiliently deflectable and as the collar is pushed onto the non-structural component P, the free ends 306 of the collar deflect away from one other to permit the non-structural component P to pass there-through and into the receiving space 304. When the non-structural component P is positioned within the receiving space 304, the free ends 306 return (e.g., snap back) to their original position (FIG. 27), thereby holding the attachment device 300 on the non-structural component. The attachment device 300 may be formed from a plastic, such as by molding plastic, or other suitable materials.

To prevent the non-structural component P from moving relative to the collar 302, the attachment device 300 includes a fastening component (not shown). The fastening component fixes (e.g., permanently attaches) the collar 302 to the non-structural component P, when the collar is mounted thereon. The fastening component inhibits the collar 302 from moving (e.g., from longitudinally and rotationally moving) relative to the non-structural component. Otherwise, the collar 302 (broadly, the attachment device 300) and non-structural component P would be free to move relative to one another because the collar does not apply a clamping (e.g., gripping) force against the non-structural component to inhibit movement, as mentioned above. In this embodiment, the fastening component can be an adhesive that bonds with the non-structural component P to fix the collar 302 to the non-structural component. The adhesive may comprise at least one of a glue or a double sided tape. Other suitable adhesives are within the scope of the present disclosure. The adhesive may be disposed over all or a portion of the interior surface of the collar 302. Preferably, the length of the collar 302 is greater than the diameter of the receiving space 304. This provides the collar 302 with an interior surface area large enough to receive a sufficient amount of adhesive to ensure the adhesive securely fixes the attachment device 300 to the non-structural component P. As described above, the collar 302 can hold the attachment device 300 on the non-structural component. This holding allows the adhesive to set (e.g., cure) without a user having to hold the attachment device 300 on the non-structural component P while the adhesive sets. In other embodiment, the adhesive may be of a type that bonds generally instantaneously with the non-structural component P. During a seismic event, where movement of the building and its components may occur, the attachment device 300 braces the non-structural component P and prevents the non-structural component P from moving relative to the sway brace/restraint 10.

The connection flange 310 (broadly, an attachment component) of the attachment device 300 extends outward from the collar 302. The connection flange 302 is configured to be attached to the sway brace/restraint 10. In the illustrated embodiment, the connection flange 310 extends from the center of the collar 302, although other positions are within the scope of the present disclosure. In particular, the connection flange 310 extends from the collar 302 in a direction that is generally perpendicular to a plane extending through the free ends 306 of the collar. The connection flange 302 includes an opening (e.g., threaded opening) 312 that receives a fastener 116 to connect the sway brace/restraint 10 to the attachment device 300. To strengthen and stiffen the connection flange 302, the connection flange includes a plurality of ribs 314 on the opposite sides of the flange. The ribs 314 may be of generally any configuration. In addition, preferably, at least a portion of the opening 314 (FIG. 27) that receives the fastener 116 has a polygonal (e.g., hexagonal) cross-sectional shape to correspond to the polygonal cross-sectional shape of a nut (not shown) threaded onto the fastener to prevent the nut from rotating relative to the fastener. Other configurations of the connection flange are within the scope of the present disclosure. For example, as shown in FIGS. 29-32, an attachment device 300A, that is similar to attachment device 300, has a connection flange 310A that extends from a lower end of the collar 302A. As a result, the connection between the sway brace/restraint 10 is moved lower and closer into horizontal alignment with the non-structural component P, which may be desirable in order to meet certain building codes. For example, depending the jurisdiction, building codes may require the assembly (e.g., sway brace/restraint 10) bracing the non-structural component to be within a specified distance of the non-structural component. In addition, in this embodiment, only one side (e.g., lower side) of the connection flange 310A includes ribs 314A.

Figure 33:
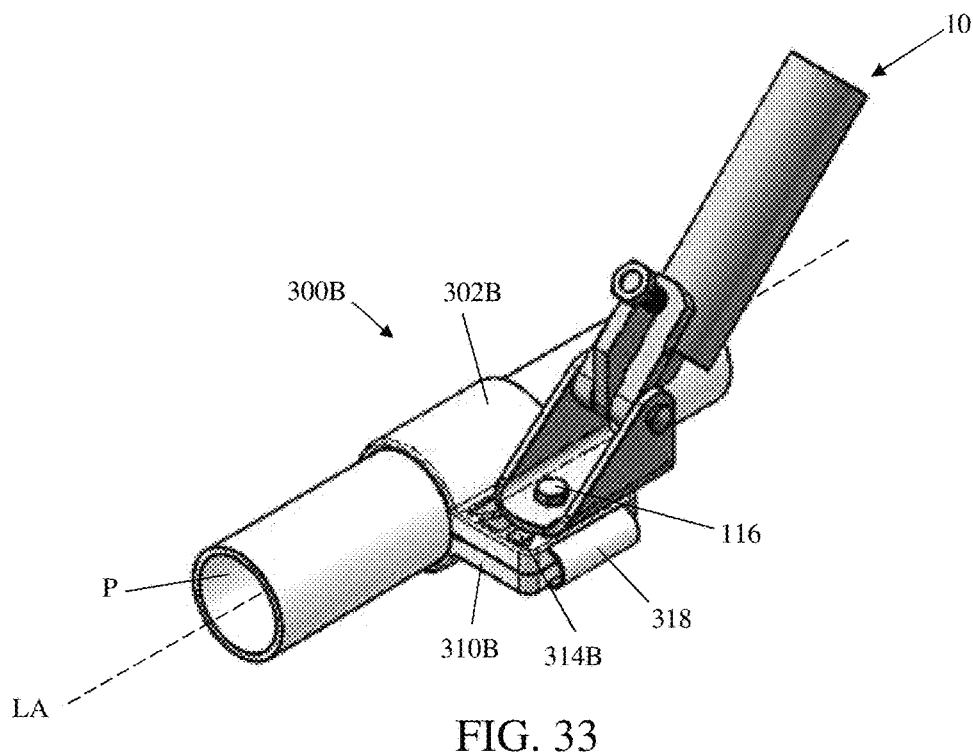
FIG. 33 is a perspective of another embodiment of an attachment device coupling a non-structural component to a structural component according to the teachings of the present disclosure.
Figure 34:
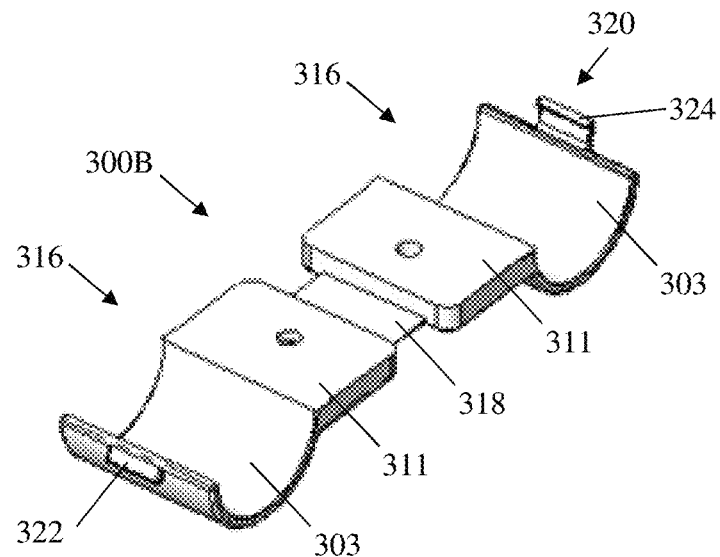
FIG. 34 is a perspective of the attachment device of FIG. 32 in an open configuration.

Referring to FIGS. 33 and 34, another embodiment of an attachment device is generally indicated at reference number 300B. Attachment device 300B is similar to attachment device 300, and functions in a similar manner, except as described below. In this embodiment, the attachment device 300B includes a collar 302B that extends around the entire perimeter of the non-structural component P. In this embodiment, the attachment device 300B is comprised of first and second attachment portions 316 that are joined together by a hinge 318. In the illustrated embodiment, the hinge 318 is a flexible piece of material although other hinges, such as living hinges, are within the scope of the present disclosure. The hinge 318 allows the first and second attachment portions 316 to move from an open configuration (FIG. 34) to a closed configuration (FIG. 33) to mount the attachment device 300B to the non-structural component P. Each attachment portion 316 includes a connection flange portion 311 and a collar portion 303. Each collar portion 303 extends around half (e.g., 180 degrees) of the perimeter (e.g., circumference) of the non-structural component P. The connection flange portion 311 extends from one end of the collar portion 303. In this embodiment, the hinge extends from (e.g., interconnects) the connection flange portions 311 of the attachment portions 316. In the closed configuration, the two connection flange portions 311 of the attachment portions 316 form the connection flange 310B and the two collar portions 303 of the attachment portions form the collar 302B.

Figure 35:
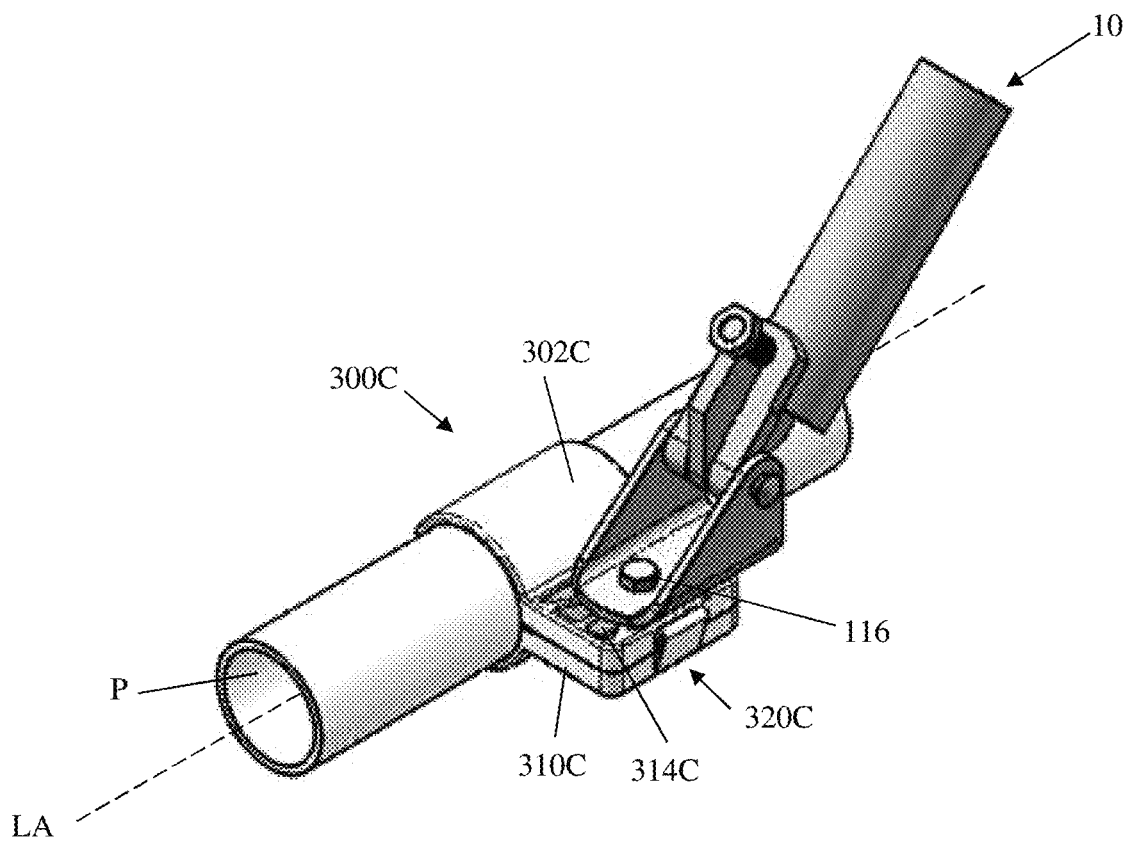
FIG. 35 is a perspective of another embodiment of an attachment device coupling a non-structural component to a structural component according to the teachings of the present disclosure.
Figure 36:
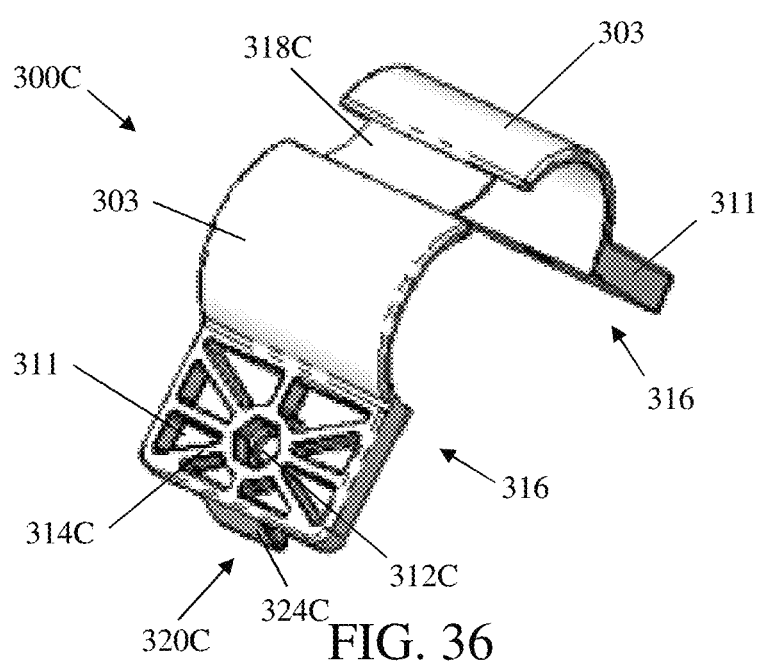
FIG. 36 is a perspective of the attachment device of FIG. 35 in an open configuration.

The attachment device 300B includes a clasp 320 to secure the attachment portions 316 in the closed configuration. The clasp 320 includes a shoulder 322 and a detent or catch 324 configured to engage the shoulder to secure the attachment device 300B in the closed configuration. One attachment portion 116 includes the detent 324 and the other attachment portion includes the shoulder 322. In the illustrated embodiment, the detent 324 extends from one end of one of the collar portions 303 and the shoulder 322 is adjacent to the one end of the other collar portion. The ends of the collar portions 303 the shoulder 322 and detent 324 are attached to generally engage one another when the attachment device 300B is in the closed configuration. Other configurations of the attachment device 300B are within the scope of the present disclosure. For example, as shown in FIGS. 35 and 36, an attachment device 300C includes a hinge 318C that extends between and interconnect the collar portions 303. Likewise, in this embodiment, the shoulder 322C and detent 324C of the clasp 320C are connected to the connection flange portions 311, respectively.

To mount the attachment device 300B (or attachment device 300C) on the non-structural component P, the attachment portions 316 are moved from the open configuration to the closed configuration such that the non-structural component is disposed in the receiving space defined by the collar 302B (e.g., collar portions 303). The detent 324 engages the shoulder 322 to hold the attachment device 300B in the closed configuration and on the non-structural component. This holding allows the attachment device 300B and the non-structural component P to be fixed together, via the fastening component (e.g., allow the adhesive to set), without requiring a user to hold the attachment device on the non-structural component. As described in the embodiments above, the collar 302B does not compress the non-structural component P.

It is understood that attachment devices 300-300C are similar and that one having ordinary skill in the art understands the teachings regarding one attachment device may apply equally to another attachment device.

It is apparent that the elements, features, and/or teachings set forth in each embodiment disclosed herein are not limited to the specific embodiments the elements, features and/or teachings are described in. Accordingly, it is understood that the elements features and/or teachings described in one embodiment may be applied to one or more of the other embodiments disclosed herein. For example, it is understood that any of the stops disclosed herein may be used with any of the non-structural component holders disclosed herein.

For ease of comprehension, where similar or analogous parts are used between embodiments, corresponding reference numbers are used with a different trailing letter and/or prime. For example, stop 150A is analogous to stop 150 and, thus, stop 150A includes the trailing "A."

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An attachment device for securing a non-structural component of a building to a structural component of the building, the attachment device comprising:
 a non-structural component holder defining a receiving space configured to receive the non-structural component to couple the non-structural component to the attachment device, wherein the non-structural component holder applies generally no compressive force against the non-structural component when the non-structural component is disposed in the receiving space so that the non-structural component is free to move relative to the non-structural component holder; and
 a stop configured to be secured to the non-structural component, the stop configured to engage the non-structural component holder to inhibit movement of the non-structural component relative to the non-structural component holder when the stop and non-structural component holder are secured to the non-structural component, wherein the stop includes first and second collars, the first collar configured to inhibit longitudinal movement of the non-structural component relative to the non-structural component holder in the first direction and the second collar configured to inhibit longitudinal movement of the non-structural component relative to the non-structural component holder in the second direction,
 wherein the stop includes a fastening component configured to fix the stop to the non-structural component, and
 wherein the stop includes a break-off tab configured to be separated from a portion of the stop to indicate that the stop is fixed to the non-structural component.

2. The attachment device of claim 1, wherein the stop inhibits rotational movement of the non-structural component relative to the non-structural component holder.

3. The attachment device of claim 1, wherein the stop inhibits rotational movement of the non-structural component relative to the non-structural component holder in clockwise and counter-clockwise directions.

4. The attachment device of claim 3, wherein the stop includes first and second braces, the first brace configured to inhibit rotational movement of the non-structural component relative to the non-structural component holder in the clockwise direction and the second brace configured to inhibit rotational movement of the non-structural component relative to the non-structural component holder in the counter-clockwise direction.

5. The attachment device of claim 2, wherein the stop inhibits rotational movement of the non-structural component relative to the non-structural component holder in clockwise and counter-clockwise directions.

6. The attachment device of claim 1, wherein the fastening component is an adhesive configured to bond with the non-structural component to fix the stop to the non-structural component.

7. The attachment device of claim 6, wherein the adhesive comprises at least one of a glue or a double sided tape.

8. The attachment device of claim 1, wherein the stop is configured to snap onto the non-structural component.

9. An attachment device for securing a non-structural component of a building to a structural component of the building, the attachment device comprising:
   a collar defining a receiving space configured to receive the non-structural component to couple the non-structural component to the attachment device, wherein the collar applies generally no compressive force against the non-structural component when the non-structural component is disposed in the receiving space so that the non-structural component is free to move relative to the collar;
   a fastening component configured to fix the collar to the non-structural component to inhibit movement of the non-structural component relative to the collar, wherein the fastening component is an adhesive configured to bond with the non-structural component to fix the collar to the non-structural component; and
   a connection flange extending from the collar, the connection flange configured to attach to the structural component for securing the attachment device to the structural component, wherein the connection flange comprises a side portion with a plurality of ribs.

10. The attachment device of claim 9, wherein the fastening component inhibits longitudinal and rotational movement of the non-structural component relative to the collar.

11. The attachment device of claim 9, wherein the adhesive comprises at least one of a glue or a double sided tape.

* * * * *